(12) United States Patent
Harman et al.

(10) Patent No.: US 8,429,038 B1
(45) Date of Patent: Apr. 23, 2013

(54) RECEIPT VISUALIZATION AND RECEIPT DATA APPLICATIONS

(75) Inventors: Susan A. Harman, San Diego, CA (US);
Ronald J. Char, San Diego, CA (US);
Abraham Zafar, San Diego, CA (US);
Ojas R. Sitapara, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/286,101

(22) Filed: Oct. 31, 2011

Related U.S. Application Data

(63) Continuation of application No. 12/609,922, filed on Oct. 30, 2009, now Pat. No. 8,095,439.

(51) Int. Cl.
*G07B 17/00* (2006.01)
*G07F 19/00* (2006.01)
*G06Q 40/00* (2012.01)
*G06Q 20/00* (2012.01)
*G07G 1/12* (2006.01)
*G07G 5/00* (2006.01)

(52) U.S. Cl.
USPC .............. 705/30; 705/39; 705/16; 705/24

(58) Field of Classification Search .................... None
See application file for complete search history.

(56) References Cited

U.S. PATENT DOCUMENTS

| | | | |
|---|---|---|---|
| 6,487,540 B1 | 11/2002 | Smith et al. | |
| 6,738,749 B1 | 5/2004 | Chasko | |
| 7,455,226 B1 | 11/2008 | Hammond et al. | |
| 7,552,087 B2 | 6/2009 | Schultz et al. | |
| 7,555,476 B2* | 6/2009 | Holbrook | 1/1 |
| 7,792,709 B1* | 9/2010 | Trandal et al. | 705/26.1 |
| 7,987,120 B2 | 7/2011 | Shiftan et al. | |
| 2001/0029483 A1 | 10/2001 | Schultz et al. | |
| 2001/0037207 A1 | 11/2001 | Dejaeger | |
| 2003/0020762 A1* | 1/2003 | Budrys et al. | 345/835 |
| 2004/0220964 A1 | 11/2004 | Shiftan et al. | |
| 2004/0225567 A1 | 11/2004 | Mitchell et al. | |
| 2005/0049928 A1 | 3/2005 | Naick et al. | |

(Continued)

OTHER PUBLICATIONS

Non-Final Office Action dated Oct. 3, 2011 in U.S. Appl. No. 12/625,540, filed Nov. 24, 2009, inventor: Ji Hoon Shin et al., 15 pages.

(Continued)

*Primary Examiner* — Ryan Zeender
*Assistant Examiner* — Allen Chein
(74) *Attorney, Agent, or Firm* — Gary D. Lueck; Vista IP Law Group LLP

(57) ABSTRACT

Visually presenting spending behavior, spending patterns, and spending activity to a consumer across of their all receipt based purchase transactions. Receipt data is received at a first or host computer from respective transaction processing devices or host systems of respective merchants, or received from self-service action of the consumer, and identifies respective goods or services purchased by the consumer. A user interface is displayed to the consumer and comprises a thumbnail arrangement of discrete objects, each of which represents respective receipts generated by respective transaction or transaction processing devices. A discrete object may comprise data of one or multiple goods or services and includes category indicators that visually inform the consumer about the type of good or service. Embodiments may also involve requesting receipt data utilizing a mobile communication device, searching receipt data collected by the computer and responding to the request with requested receipt data.

17 Claims, 25 Drawing Sheets

U.S. PATENT DOCUMENTS

| | | |
|---|---|---|
| 2006/0038003 A1 | 2/2006 | Wakasa et al. |
| 2007/0069013 A1 | 3/2007 | Seifert et al. |
| 2007/0094087 A1 | 4/2007 | Mitchell et al. |
| 2007/0164106 A1* | 7/2007 | McDevitt et al. ............ 235/383 |
| 2007/0288322 A1 | 12/2007 | Watanabe |
| 2009/0271265 A1 | 10/2009 | Lay et al. |

OTHER PUBLICATIONS

Non-Final Office Action dated Aug. 29, 2011 in U.S. Appl. No. 12/650,343, filed Nov. 4, 2009, inventor: Susan A. Harman, 25 pages.

* cited by examiner

| Consumer Identification | Transaction Date | Category | Receipt Data |
|---|---|---|---|
| $ID_1$ | $Date_1$ | $Category_1$ | $Data_1$ |
| $ID_2$ | $Date_2$ | $Category_2$ | $Data_2$ |
| $ID_3$ | $Date_3$ | $Category_3$ | $Data_3$ |
| $ID_n$ | $Date_n$ | $Category_n$ | $Data_n$ |

FIG. 3

First Name  — 604a

Susan

Last Name  — 604b

Email Address  — 604c

☐ Use my email address as my User ID

We'll use this email address if you need to reset your password or retrieve your User ID User ID  — 604d Password  — 604e Confirm Password  — 604e Security Question  — 604f Select a question... ▼

Security Answer  — 604g

Let's Confirm Your Identity and Match You to Your Receipts

We won't bother you with this step next time you want to see your receipts. QuickReceipts will automatically get all your receipts for this store in the future.

MY STORES

SAMPLE RECEIPT
PEEK... AREN'T YOU CURIOUS

7007 FRIAS ROJO
SPACE 9554
SAN DIEGO, CA 92108
(619) 293-0284

STORE ID: ⒷB/21/2008  04:55:52

CUSTOMER ID: 0000080100800003

JUNGLE ELEPHANT         24.00 T
JLF01200000000
SUB TOTAL               $24.00
TAXABLE                   2.10
TOTAL                  $26.10 Ⓒ
                         26.10

REF: 00000
LJFLKDJ006506500
SALES PERSON: 244 KELLY

0000010600199630017008032102054

<< BACK

*peek*
...AREN'T YOU CURIOUS

Ⓐ Curious Crew number —— 606a
[            ]

I don't have this info

Confirm you Curious Crew number —— 606a
[            ]

Ⓑ Date of Purchase —— 606b
[Month ▼] [Day ▼] [Year ▼]

Ⓒ Total transaction amount —— 606c
[            ]

CONTINUE >>

MY CATEGORIES
- Impor
- Big Ti
- Busin
- Clothi
- Cosm
- Electr
- Groc
- Health
- Home

FIG. 6D

RECENT

- Receipts - Last 30 Days
- Receipts - Last 90 Days

450d

MY STORES [Add-Store]

Peek Aren't You Curious

MY CATEGORIES [Add/Edit]

- ☆ Important → 430
- Big Ticket
- Business
- Clothing
- Cosmetics — 450b
- Electronics
- Groceries
- Health
- Home
- Tax Related

---

<< Back to all     Peek Aren't You Curious peek — 608
...AREN'T YOU CURIOUS

RECEIPT

500i/422

Purchased on 9/2/2009 — 500a

Store #: 103
15051 N. Kierland Ave Space 120
Scottsdale, AZ 85254

Cashier: 229

Transaction #: — 612
0000010300103001200909020000025 — 500m

Curious Crew — 500b

ID: 41010300005 — 500e
500d

| CAT. | QTY | DESCRIPTION | ITEM# — 500c | PRICE | EXT.PRICE |
|---|---|---|---|---|---|
| 📖 | 1.0 | The Way Things Work | 9780395938478 — 500f | 35.00 | $35.00 |
| ➕ | | | 500h | | |
| 430 | | | 500i — Kierland 8.30% — 500g | SUBTOTAL | 35.00 |
| | | | 423/500j — TOTAL | | $2.91 |
| | | | | | $37.91 |

PAYMENT INFO

Payment Method: Debit Card    Total:   $37.91
Account #: XXXXXXXXXXXX5907    Card Type:

RECENT
- Receipts - Last 30 Days
- Receipts - Last 90 Days  _450d_

MY STORES  [Add-Store]
- Peek Aren't You Curious
- Smart & Final

MY CATEGORIES  [Add/Edit]
- ☆ Important  _430_
- Big Ticket
- Business
- Clothing
- Cosmetics  _450b_
- Electronics
- Groceries
- Health
- Home
- Tax Related << Back to all                                      Peek Aren't You Curious

[Smart&Final]  ~608                              RECEIPT

Purchased on 9/2/2009  _500a_  _500l_

Store #: 496                    Cashier: 8108860
13802 SCOTTSDALE RD. STE 110    Transaction #: SMF-20090902-155926-
SCOTTSDALE, AZ 85254            496-3-130

[SmartAdvantage]      _500m_  _500b_  _500d_
ID: 40021239393

CAT. QTY DESCRIPTION  _500e_  ITEM#              PRICE    EXT. PRICE
                                                          _500b_    _500g_
[+] 1.0 EL GUAPO MENUDO MIX    00044989011251     0.69     0.69 FD
[+] 1.0 WATER                  00000000006224    1.79     1.79 FD
[+] 1.0 WATER                  00000000006224    1.79     1.79 FD
                                           _500k_   SUBTOTAL  $4.27
                                         _500h_      TOTAL  $4.27
                                                _500j_

PAYMENT INFO
Payment Method:  ATM/Debit Card    Total:       $14.27
Account #:       XXXXXXXXX5907     Card Type:   VISA
Approval Code:   312583            Reference:   137034

CHANGE
Cash:              Cash:           Total:       $10.00

[Smart&Final]
CHECK OUT
OUR WEEKLY
STORE SPECIALS
[VIEW SPECIALS]

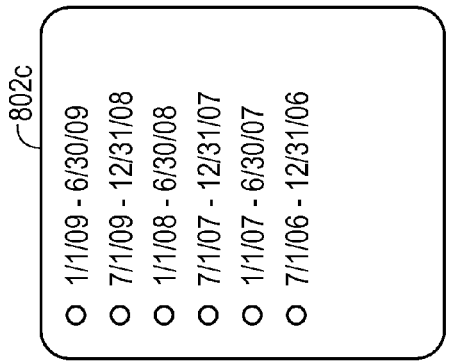
FIG. 8B
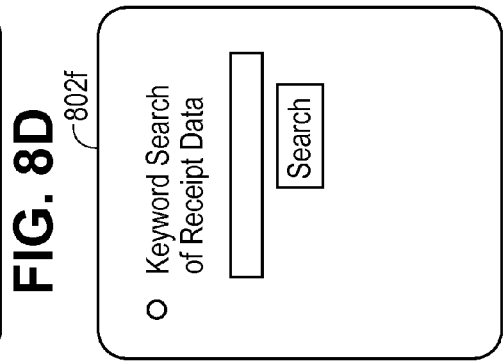
FIG. 8C
FIG. 8D
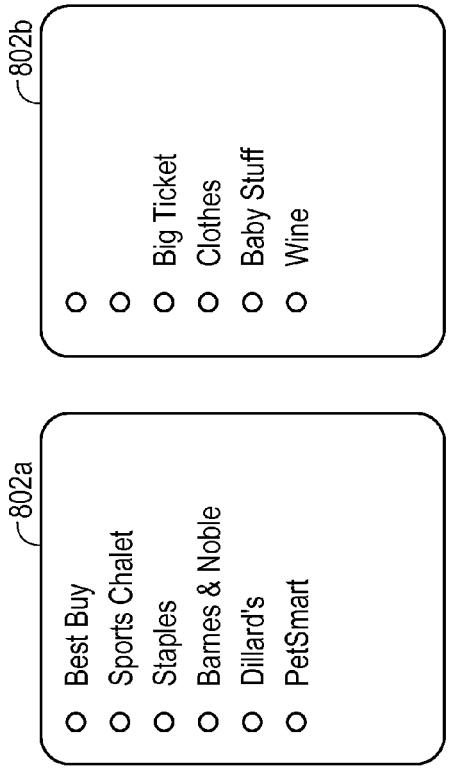
FIG. 8E
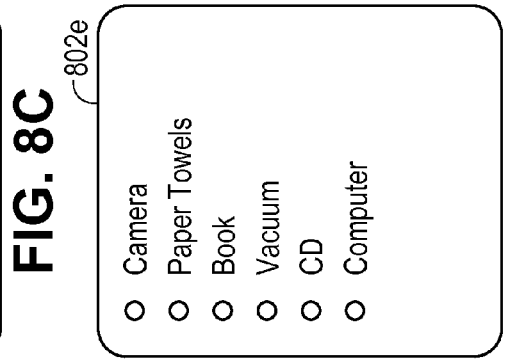
FIG. 8F
FIG. 8G

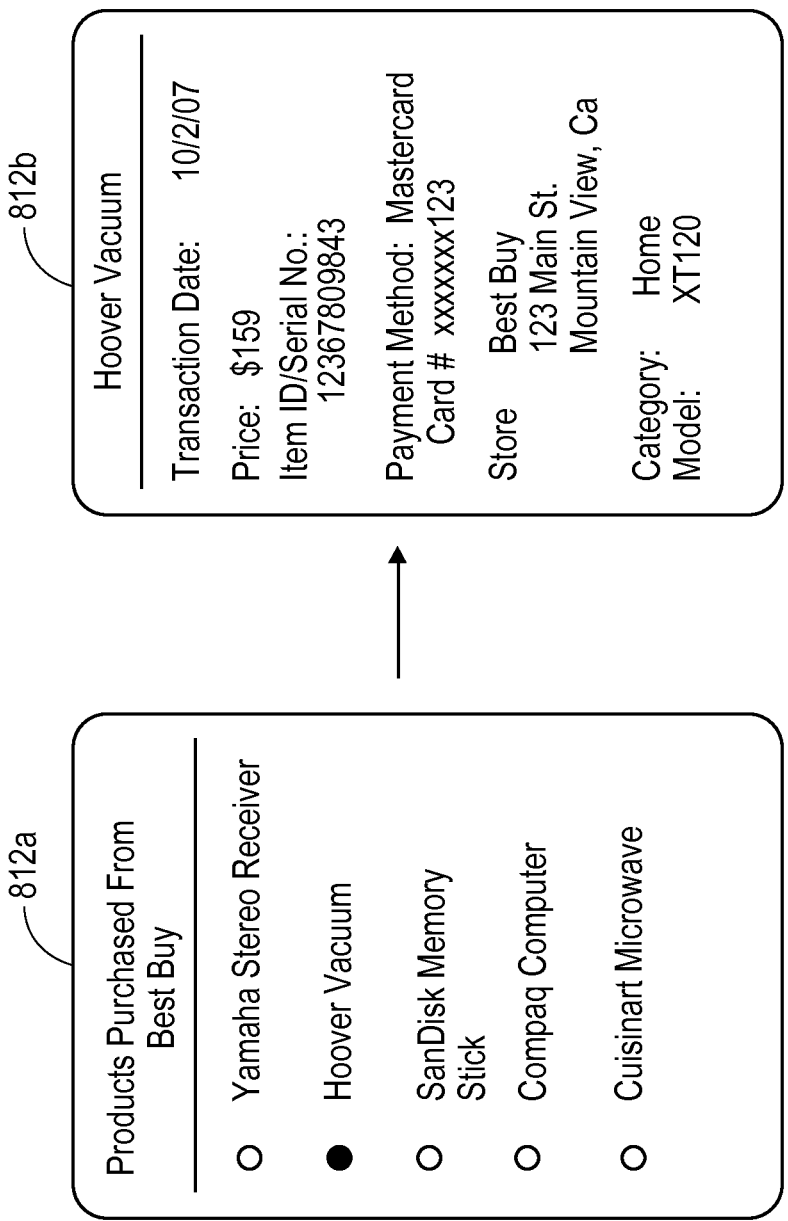

RECEIPT VISUALIZATION AND RECEIPT DATA APPLICATIONS

RELATED APPLICATION

The present application is continuation of U.S. patent application Ser. No. 12/609,922, filed Oct. 30, 2009, priority of which is claimed under 35 U.S.C. §120, and the contents of which are incorporated herein by reference.

BACKGROUND

The invention is generally related to personal finance, and more particularly, to item level receipt data, managing item level receipt data and item level receipt data applications. Consumers utilize various forms of payment to pay for goods and services including credit card, debit card, automated teller machine (ATM) card, check, automated clearing house (ACH) wire and cash. Certain transactions are debited from consumer bank accounts. For example, a checking or savings account may be debited when a consumer utilizes a debit card to purchase a good or service. Goods and services are also paid for by credit card. Credit card transactions appear as line items in credit card accounts.

For certain types of transactions, consumers can access their respective on-line accounts to view certain transaction information and statements. However, the transaction information that is available is rather limited. For example, such information may be limited to merchant name, transaction amount and transaction date. Further, this information is presented to the consumer in a single line item format. Thus, additional, lower level or item level receipt details are not available since such information is not accessible from a bank account or credit card account, and if consumers need to view older transaction data that does not appear in a current statement, one or more prior statements must be downloaded and transaction entries must be searched before older transactions can be reviewed. This can be inconvenient and time consuming.

Other systems, e.g., systems of AfterBot, Inc. and as described in U.S. Pat. No. 7,552,087, collect receipt data from the individual merchants from whom goods and services were purchased. Consumers can access collected receipt data by viewing it on a particular web site without logging onto an on-line bank or credit card account. Such systems, however, have limited capabilities, functionality and user interfaces such that consumers are not able to readily obtain a visual snapshot of spending patterns and receipt data. Further, depending on the types of information that are available, consumers may be required to visit individual merchant sites in order to view receipts or receipt data.

SUMMARY

One embodiment is directed to a method of visually presenting spending activity or receipt data to a consumer. The method comprises receiving, at a first computer, receipt data from respective transaction processing devices of respective merchants. The respective receipt data identifies purchases of respective goods or services by the consumer from respective merchants. The method further comprises generating, with a receipt program that executes on the first computer or a computer associated with the first computer, a user interface comprising a thumbnail arrangement of a plurality of discrete objects. The discrete objects represent respective receipts or receipt data generated by respective payment or transaction processing devices of respective merchants. Each discrete object comprises data related to at least one good or service purchased by the consumer from a merchant. The method further comprises transmitting data of the thumbnail arrangement from the first computer to a second computer of the consumer such that the thumbnail arrangement can be displayed by the second computer to the consumer.

A further embodiment is directed to a method of providing information about a purchased good or service to a consumer. The method comprises storing, at a computer, respective receipt data received from respective transaction processing devices of respective merchants. The respective receipt data identifies purchases of respective goods or services by the consumer from respective merchants. The method further comprises utilizing a receipt program executing on the computer or an associated computer to search stored receipt data, selecting stored receipt data and/or advertisements and offers in response to the request, and sending selected receipt data and/or advertisements and offers from the computer to a mobile communication device, e.g., a cellular telephone or a smartphone. This allows the consumer to search for and receive receipt data, including lower level or item level receipt data, at various remote locations utilizing a mobile communication device.

A further embodiment is directed to a system for visually presenting spending activity, patterns or receipts to a consumer. The system comprises a first or host computer and a receipt program that executes on the computer. The first computer is operably coupled to or in communication with a second computer of a consumer and with payment or transaction processing devices of respective merchants. The first computer is operable or configured to receive receipt data directly or indirectly from respective transaction processing devices of respective merchants via respective networks. The respective receipt data identifies purchases of respective goods or services by the consumer from respective merchants. The receipt program is operable or configured to generate a user interface comprising a thumbnail arrangement of a plurality of discrete objects that represent respective receipts or receipt data generated by respective transaction processing devices. Each discrete object comprises data related to at least one good or service purchased by the consumer from a particular merchant. The receipt program is also operable or configured to transmit data of the thumbnail arrangement from the first or host computer to the second or consumer computer, and the thumbnail arrangement is displayed by the second computer to the consumer.

Another embodiment is directed to a system for providing information about a purchased good or service to a consumer and comprises a computer and a receipt program that executes on the computer. The computer is operably coupled to or in communication with transaction processing devices of respective merchants via respective networks and a mobile communication device, e.g., a cellular telephone or a smartphone. The computer is operable or configured to receive and store respective receipt data from respective transaction processing devices of respective merchants and/or related advertisements and offers. The respective receipt data identifies purchases of respective goods or services by the consumer from respective merchants. The receipt program is operable or configured to search stored receipt data, select stored receipt data and/or advertisements and offers, and send selected receipt data and/or advertisements and offers from the computer to a mobile communication device, e.g., a mobile communication device of a consumer who purchased the good or service.

Another embodiment is directed to an article of manufacture comprising a computer program carrier readable by a computer and embodying one or more instructions executable by the computer to perform method steps for visually presenting a spending summary, spending activity or receipts to a consumer. The method steps comprise receiving, at a first or host computer, respective receipt data from respective transaction processing devices of respective merchants. The respective receipt data identifies purchases of respective goods or services by the consumer from respective merchants. The method steps further comprise generating a user interface comprising a thumbnail arrangement of a plurality of discrete objects that represent respective receipts generated by respective transaction processing devices, each discrete object comprising data that is related to at least one good or service purchased by the consumer from a merchant, and transmitting data of the thumbnail arrangement from the first computer to a second computer of the consumer such that the thumbnail arrangement can be displayed by the second computer to the consumer.

Another embodiment is directed to an article of manufacture comprising a computer program carrier readable by a computer and embodying one or more instructions executable by the computer to perform method steps for providing information about a good or service to a consumer. The method steps comprise receiving and storing respective receipt data from respective transaction processing devices of respective merchants, searching stored receipt data, selecting stored receipt data and sending selected receipt data from the computer to a mobile communication device, e.g., a cellular telephone or smartphone.

In one or more embodiments, a user interface generated by a receipt program comprises a first window including the thumbnail arrangement of the plurality of discrete objects, a second window comprising a list of merchants that generated receipts represented as discrete objects, and a third window comprising a list of categories, which may be automatically determined and assigned to discrete objects and goods or services or manually created and assigned. Further, in one or more embodiments, a user interface includes a first field for a total number of receipts represented by discrete objects, a second field for a total number of items purchased, and third field for a total amount of the receipts, and the discrete objects are separated from the first field, the second field and the third field. This arrangement provides a snapshot or dashboard view or summary of consumer spending to allow the consumer to quickly visualize spending activity and to identify spending patterns while providing particular details regarding spending and receipts. A search field or window may allow a consumer to search for receipt data such as item level receipt data (e.g., product description, item number, etc.) hosted by the first or host computer.

In one or more embodiments, one or more discrete objects represent a receipt that was generated as a result of the consumer purchasing a good or service with a transaction card such as a credit card, a debit card or a gift card. The receipt may also be a receipt that was generated by the consumer paying cash for a good or service. Receipt data may be transmitted directly from a transaction processing device of a merchant, from a third party or intermediate computer that collects receipt data from merchants, and/or from a consumer. For example, the consumer may scan a paper receipt and send the scanned receipt to the host computer or forward an electronic mail receipt to the host computer for inclusion in a receipt database.

In one or more embodiments, a discrete object representing a receipt is configured or selectable by the consumer such that when the discrete object is selected, additional information about one or multiple goods or services to which that receipt relates is presented to the consumer. For example, the additional information may include an account number of a transaction card (e.g., credit or debit card), a store membership card or a rewards card that was utilized during the purchase of the good or service that that may be utilized to identify the consumer. The additional information may also include lower level or item level receipt data related to the good or service such as one or more of an indicator of a category of the good or service, a name, a description, a model or part number and an identification of the good or service.

In one or more embodiments, the discrete objects include an indicator of a category of a good or service to which the corresponding receipt relates (e.g., a color-coded or symbol indicator). Additional information that is displayed as a result of selecting a discrete object may also include a category such as a color-coded or symbol indicator to indicate, for example, whether a certain purchase is tax deductible, important to the consumer, related to certain types of goods or services (e.g., business, home, healthcare, etc.). Categories may also identify a particular brand. The categories may be automatically assigned by a receipt program or other program upon receiving the receipt data from respective merchants, e.g., based on a merchant name and/or a description or identifier of a good or service. Categories may also be created and selected by a consumer or user of the receipt program, e.g., when the consumer logs into his or her receipt account utilizing a receipt program.

Discrete objects may also include a merchant logo to identify the store from which a good or service was purchased, which assists with visually identifying spending activity or patterns. In one or more embodiments, discrete objects include a name or logo of a merchant, a transaction amount and a transaction date. Discrete objects may also include a number of days within which a purchased good can be returned to the merchant, and the return date can be based on the transaction date and the merchant or store return policy.

Embodiments may involve a discrete object that represents a receipt for a single good or service or for multiple goods or services. Further, a discrete object may include one or multiple category indicators but not identify a particular good or service, but additional details regarding particular goods or services may be obtained by selecting a particular discrete object. Embodiments may involve all receipt-based purchases by the consumers (whether by transaction card, cash or other forms of payment), and discrete objects representing receipts for all of these purchases can be displayed in a thumbnail arrangement, and item level receipt data can be searchable by the consumer, e.g., by name, a model or a description of the good or service. Category indicators can also be selected to identify or display the discrete objects or particular goods or services that are categorized in that manner.

One or more embodiments may also involve providing receipt data to a mobile communication device, e.g., a cellular telephone or smartphone. Such data may be sent to the mobile communication device in response to a consumer request for such information. For example, such embodiments may involve the consumer inputting a request for data related to a product or service that was purchased, transmitting the request from the mobile communication device to a computer that hosts receipt data, executing a receipt program to search the receipt data at the computer, select receipt data in response to the request, and send selected receipt data from the computer to the mobile communication device. For example, the requested data may be or related to item level receipt data such as a model number or a purchase date of the good or service or other item level receipt data such as a name, a description, a model or part number, an identification of the good or service, a name of a merchant, a transaction date, or a return or warranty period.

BRIEF DESCRIPTION OF THE DRAWINGS

The foregoing and other aspects of embodiments are described in further detail with reference to the accompanying drawings, wherein:

FIGS. 1A-C illustrate embodiments of a system constructed according to embodiments for visually presenting receipt or spending data to a consumer through a thumbnail arrangement of discrete objects that represent respective receipts, wherein FIG. 1A illustrates a host computer receiving data from merchants and a receipt program executing on the host computer, FIG. 1B illustrates data communication protocols and communications between certain system components that may be utilized, and FIG. 1C illustrates an embodiment in which a host computer receives receipt data indirectly from merchants and from an intermediate receipt data collection system or computer;

FIG. 3 illustrates an example of how a database of a host computer may be structured to store receipt data;

FIGS. 6A-L are screen shots of embodiments illustrating different thumbnail arrangements of discrete objects representing respective receipts;

FIGS. 8A-I illustrates different pages, screens or menus that are generated by an application executing on a mobile communication device to allow a consumer to search for receipt data at a host computer;

DETAILED DESCRIPTION OF ILLUSTRATED EMBODIMENTS

Figure 1A:
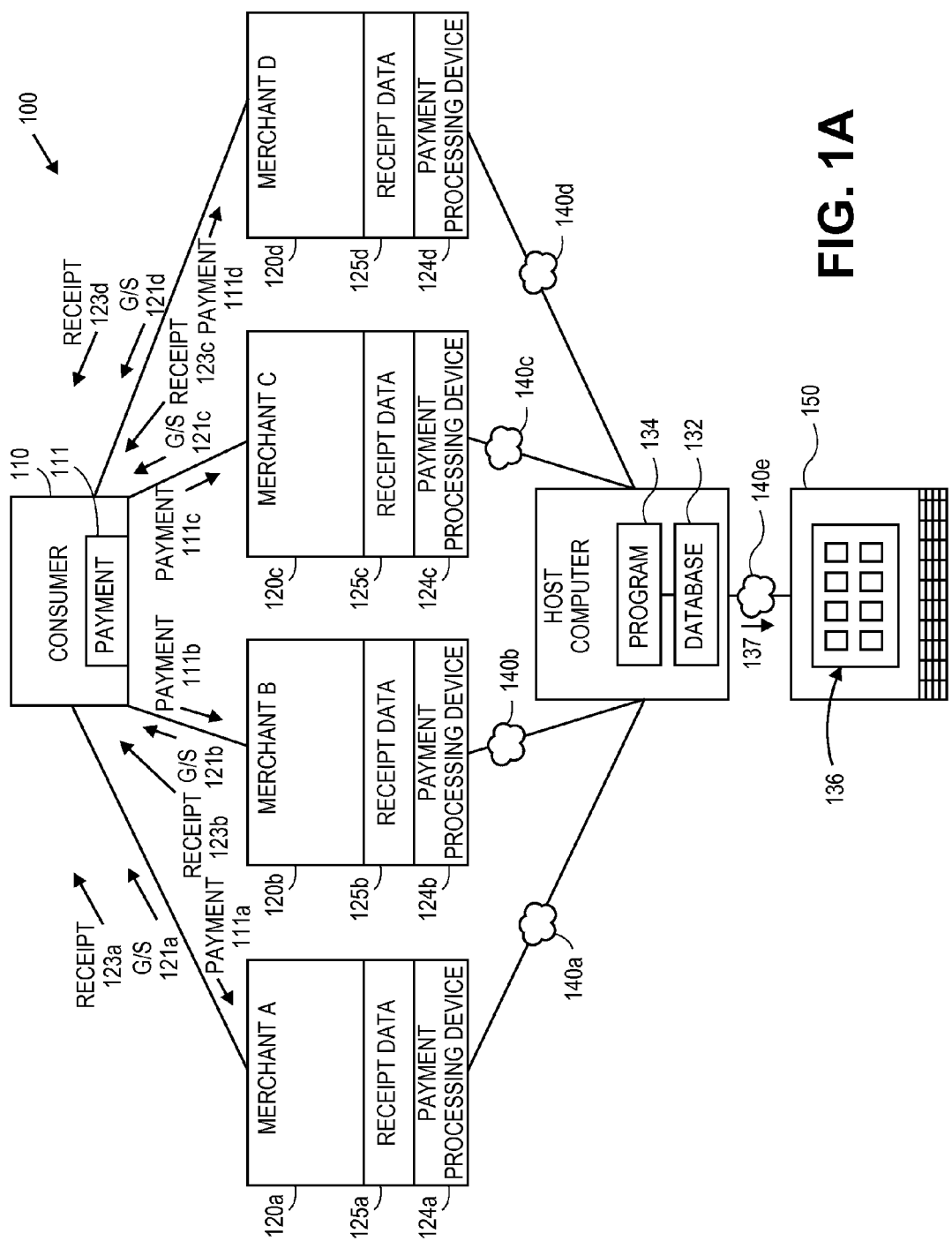

Embodiments are directed to processing and presenting receipt data, including lower level item level receipt data, to a consumer to allow the consumer to visually obtain a summary or snapshot of the receipts and consumer spending. With embodiments, receipt data is collected from various merchants, aggregated, and presented to respective consumers in the form of respective arrangement of discrete objects.

Each discrete object represents a receipt and may, for example, include a merchant logo or other identifier, transaction amount, and transaction date. Thus, consumers are presented with a visual arrangement of discrete objects that, e.g., indicate how many times the consumer went to a particular merchant as shown by a number of discrete objects (number of receipts), a total number of items purchased and total amount spent. A consumer, through pattern recognition, and without having to read certain receipt details, can quickly comprehend spending activities and patterns by viewing a snapshot of spending, frequency of purchases, merchant and brand purchasing frequency, return timeframes, spending within certain periods of times or during certain months and spending amounts. Clicking on or selecting a discrete object opens the discrete object such that the consumer can then view lower level or item level details (e.g., product name, model or item number, barcode information, form of payment, etc.) of goods or services that were purchased and reflected in the receipt represented by the selected discrete object.

In addition to providing a thumbnail arrangement of discrete objects for spending or receipt visualization and pattern recognition, embodiments also provide for a multi-level categorization for money management purposes such that categories of goods of services of a receipt may be displayed in a discrete object that represents a receipt, and clicking on or selecting a discrete object displays item level receipt data and the particular categories assigned to specific goods or services. Thus, with embodiments, consumers are presented with a first level or dashboard or snapshot categorized spending and a second or more detailed item level spending summary that also includes category information. Category indicators can also be selected to display all of the discrete objects or receipts that are assigned to the selected category.

Further, embodiments provide for mobile lookup of receipt data. In these embodiments, an application may execute on a mobile communication device, and a consumer launches the application to log into a receipt database or receipt management system through the mobile communication device. Through menus or interfaces displayed on a screen of the mobile communication device, the consumer can request information including receipt item details such as description and price, offers, and coupons related to a particular good or service and receive the requested information at the mobile communication device. Further aspects of various embodiments are described with reference to FIGS. 1A-10.

Figure 1B:
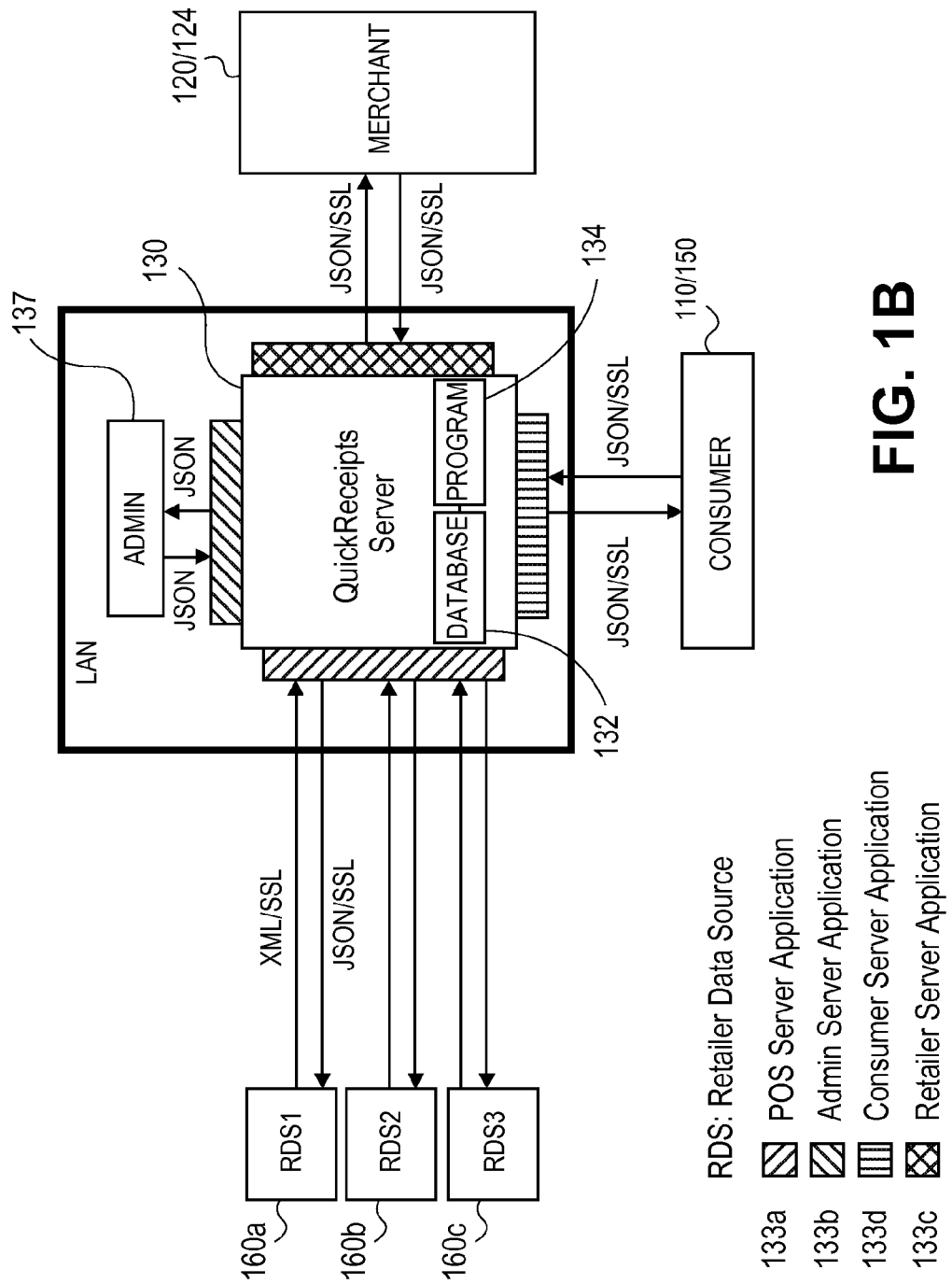
Figure 2:
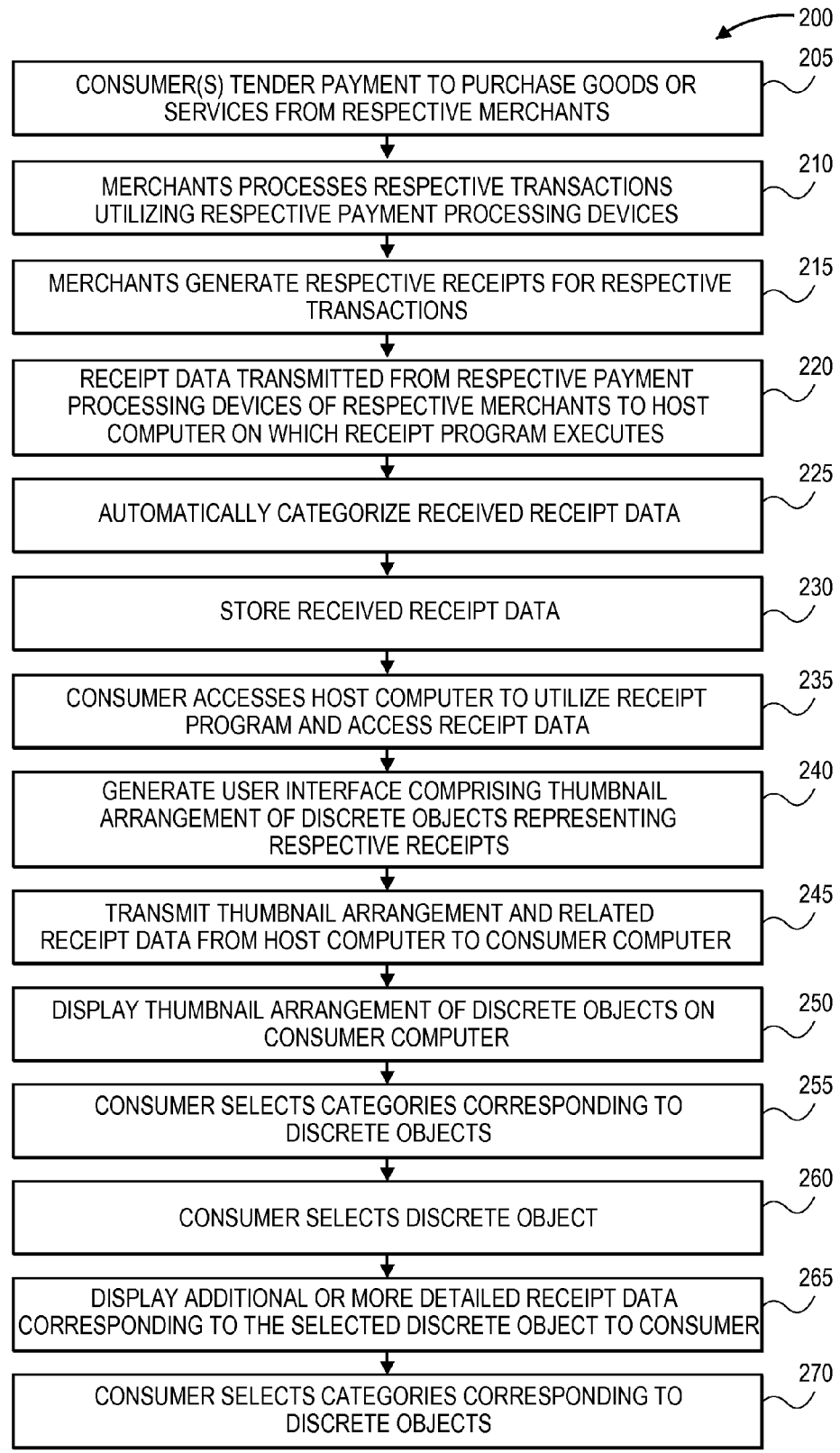
FIG. 2 is a flow chart of a method of visually presenting receipt or spending data to a consumer through a thumbnail arrangement of discrete objects that represent respective receipts.

Referring to FIGS. 1A-B and FIG. 2, embodiments are directed to systems 100 and related methods 200 and articles of manufacture for visualizing receipt data and receipt-based purchases by a consumer. In the illustrated embodiment, the consumer 110 purchases various goods and services (G/S) 121*a-d* (generally, good 121) from respective merchants 120*a-d* (generally, merchant 120). References to a "good 121" are defined to include goods and services, and references to "merchant 120" are defined to include merchants who offer and sell goods and services, including in-store or brick and mortar merchants and on-line merchants that sell goods 121 through respective websites. Various types of goods 121 may be purchased by the consumer 110, and the consumer 110 may purchase one or multiple goods 121 from each merchant 120. Examples of goods 121 include, but are not limited to, home or house wares, groceries, electronics, home repair, healthcare or personal hygiene items, clothing, business items, books, etc. It should be understood that embodiments may and can involve various types of goods 121 and various types and numbers of merchants 120, including four merchants 120*a-d* (as illustrated in the example shown in FIG. 1A), ten, one hundred and thousands of merchants 120, and that the consumer 110 may purchase goods 121 from some or all of these merchants 120. Further, while FIG. 1A illustrates one consumer 110 and multiple merchants 120, embodiments may involve aggregating receipt data from multiple merchants 120 for purchases made by multiple consumers 110, e.g., two, ten, hundreds, thousands and other numbers of consumers 110, and embodiments can be operable to provide a dashboard or snapshot of receipts and spending to different consumers 110.

With reference to FIG. 2, during a transaction, at stage 205, the consumer 110 tenders a form of payment 111 to purchase one or more goods 121 from each merchant 120. Payment 111 may be made using a transaction card (e.g., credit card, debit card, gift card, etc.), check, cash and other forms of payment 111. FIG. 1A illustrates one example in which a consumer 110 tenders payment 111a-d (generally, 111) to purchase respective goods 121a-d (generally, 121) from respective merchants 120a-d (generally, 120). As a result of the transaction, at stage 210, the merchants 120 process their respective transactions utilizing respective transaction processing devices 124a-d (generally, transaction processing device 124) and at stage 215, generate consumer receipts 123a-d (generally, consumer receipt 123) and store electronic receipt data 125a-d (generally, receipt data 125).

Depending on the form of payment 111, a merchant 120 processes the transaction with a transaction processing device 124 such as a Point of Sale (POS) payment terminal, cash register, computer, scanner system, etc. With electronic types of transaction processing devices 124, transaction or receipt data 125 can be stored electronically, and in the event of a cash payment, the merchant 120 may enter transaction or receipt data manually in order to generate a consumer receipt 123 and receipt data 125. Thus, receipt data 125 maintained or stored by a merchant 120 may be in electronic form, and the consumer receipt 123 provided to the consumer 110 may be paper and/or in electronic form (e.g., a paper or electronic mail receipt). The receipt data 125 may include a name of the merchant 120, a transaction date, a transaction amount, and information related to the form of payment 111 (e.g., credit card, debit card, etc.).

At stage 220, receipt data 125 is transmitted from transaction processing devices 124 of the merchants 120 to a first or host computer 130 (generally, host computer 130) that collects or aggregates receipt data 125 related to various consumers 110 from respective merchants 120. One example of a host computer 130 that may be utilized for this purpose is a computer or server of Intuit Inc. Receipt data 125 may be collected and stored at the host computer 130 in a receipt database, table or data store 132 (generally, receipt database 132). For this purpose, transaction processing devices 124 of merchants 120 are operably coupled to or in communication with the host computer 130 via respective networks 140a-d (generally, network 140).

Examples of networks 140 that may be utilized for communications between these and other system 100 components include but are not limited to a Local Area Network (LAN), a Wide Area Network (WAN), Metropolitan Area Network (MAN), a wireless network, other suitable networks capable of transmitting data, and a combination of such networks. For ease of explanation, reference is made to a network 140 generally, but various networks, combinations of networks and communication systems, methods and protocols may be utilized in embodiments.

Further, as shown in FIG. 1B, communications between transaction processing devices 124 and the host computer 130 may, for example, involve JavaScript Object Notation (JSON) data interchange format and Secure Sockets Layer (SSL) communication protocol or other suitable formats and protocols, and an associated host computer—transaction processing device interface 133a. The same or similar data interexchange formats and communication protocols and an administration application 133b may also be used for communications between an administrator 137 (e.g., an administrator of Intuit Inc.) and the host computer 310.

Referring again to FIG. 1A, receipt data 125 may be sent from respective transaction processing devices 124 to the host computer 130 periodically (e.g., daily or weekly), in response to a request for receipt data 125 from a receipt program 134 that executes on the host computer 130 (as shown in FIG. 1) or in response to a request from a receipt program 134 that executes on an associated computer or server that is operably coupled to or in communication with the host computer 130. The receipt program 134 may be implemented as hardware, software or a combination thereof, but reference is made to a receipt program 134 for ease of explanation. One example of a receipt program 134 that may be utilized in embodiments is QuickReceipts® of Intuit Inc., and in the embodiment illustrated in FIG. 1B, the host computer 130 is identified as QuickReceipts® Server.

Figure 1C:
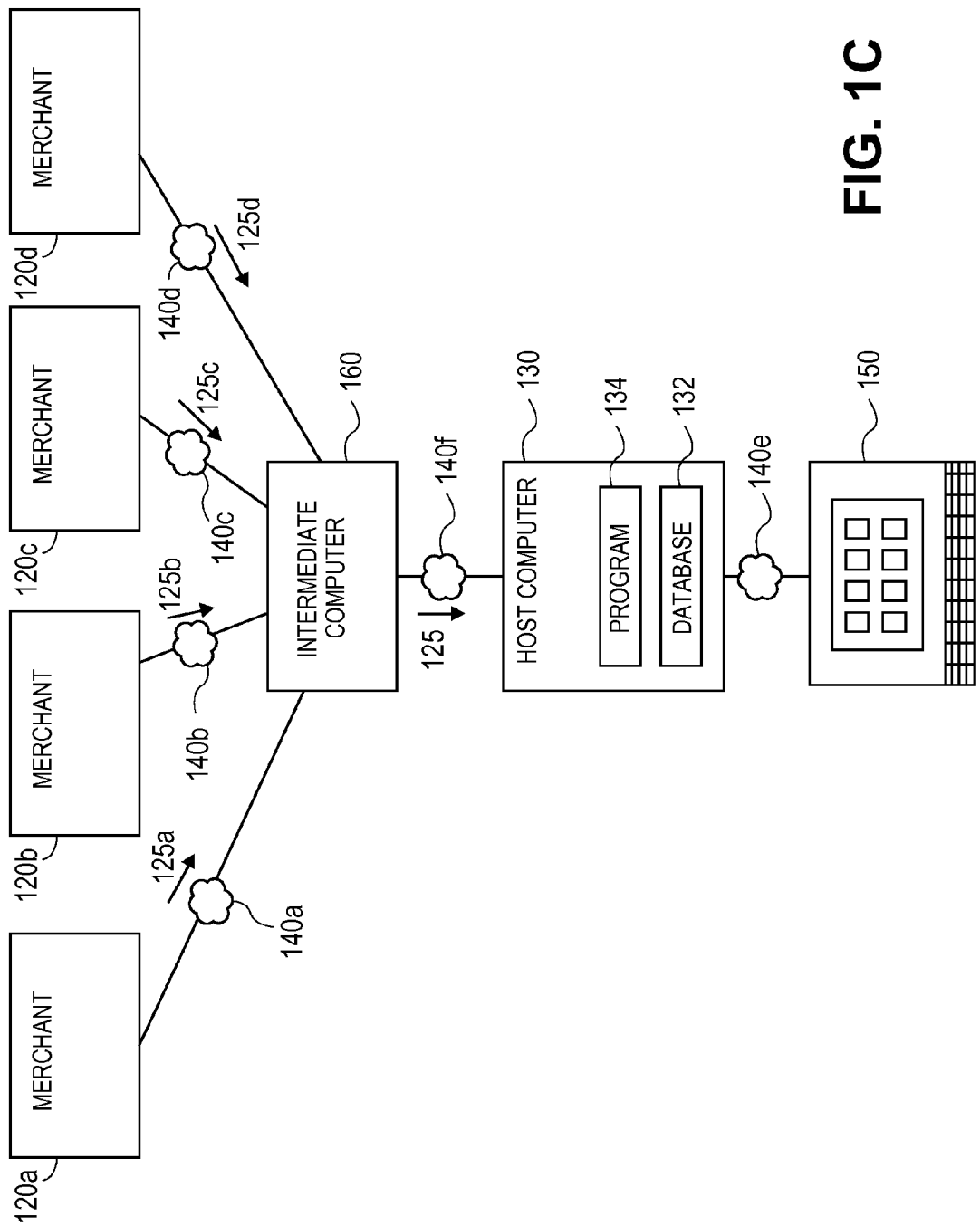

FIG. 1A illustrates an embodiment in which receipt data 125 is received from respective transaction processing devices 124, but in other system embodiments, e.g., as shown in FIG. 1C, one or more retailer or third party or intermediate computers or systems 160a-c (generally, intermediate computer 160, and otherwise referred to as retailer data source (RDS) in FIG. 1C) may be used to collect receipt data 125 from merchants 120 and to provide collected receipt data 125 to the host computer 130.

One example of an intermediate computer or system 160 that may be utilized for this purpose is a computer or system of Afterbot, Inc. Such an intermediate computer or system 160 may communicate with the host computer 130 through a network 140f. For this purpose, as shown in FIG. 1B, communications between one or more intermediate computers 160a-c (generally, intermediate computer 160) and the host computer 130 may, for example, involve JavaScript Object Notation (JSON) data interchange format and Secure Sockets Layer (SSL) communication protocol or other suitable formats and protocols and an associated host computer—intermediate computer interface 133d. Embodiments may involve receiving receipt data 125 directly from merchants 120, from intermediate computers 130 that collect the receipt data from merchants 120, or both.

Further, although embodiments are described with reference to receipt data 125 received from merchants 120, receipt data 125 may also be based on or retrieved from a paper or electronic mail consumer receipt 123. For example, a consumer 110 may scan a paper or e-mail receipt 123 and upload or e-mail the copy or scan to the host computer 130 for inclusion in the database 132. For example, the receipt program 134 may employ Optical Character Recognition (OCR) or another suitable text reading system to store the receipt data 125 in the database 132. Further, the consumer 110 can scan paper or e-mail receipts 123 and store them in a folder on the consumer computer 110, and when the consumer 110 connects to the host computer 130 and launches the receipt program 134, the receipt program 134 may determine that there is additional receipt data in the folder and upload that data to the host computer 130 for inclusion in the database 132. For ease of explanation, reference is made to receipt data 125 received from merchants 120, but it should be understood that receipt data 125 may also be entered or received from other sources including the consumer 110 and a third party or intermediate computer 160.

Referring again to FIGS. 1A and 2, at stage 225, in certain embodiments, the receipt data 125 received at the host computer 130 is categorized, e.g., automatically by the receipt program 134 or another program. At stage 230, the received and/or categorized receipt data 125 is stored in the receipt database 132, which may be used to aggregate receipt data 125 of various consumes 110 from various merchants 120.

Referring to FIG. 3, the collected or received receipt data 125 may be stored in a receipt database 132 that is structured as a table or other data structure 300 that includes a first column 301 for identification of the consumer 110 (e.g., one or more of name, QuickReceipts® account identification number, social security number, e-mail address, transaction card number, store card number such as a Best Buy® card number, a number of a card associated with a universal receipt or loyalty program such as QuickReceipts®, or other unique identifying information), a second column 302 for transaction date, and a third column 303 for a category or category indicator, and a fourth column 304 for various receipts or receipt data 125. For example, receipt data 125 of first consumer 110a may be stored in a receipt database 134 according to consumer identification in the form of a supermarket club card number, e.g., a Vons card number or a Ralphs card number, receipt data 125 of a second consumer 110b may be stored according to consumer identification in the form of a credit card number, receipt data for a third consumer 110c may be stored in the receipt database 134 according to a rewards card number such as a Best Buy® rewards zone card number, and so on. Thus, various consumer 110 identifiers may be utilized to link a consumer 110 to particular receipt data 125 stored in the database 134. It should be understood that the table 300 illustrated in FIG. 3 may include other types of data and different numbers of columns and is provided to generally illustrate that receipt data 125 is associated with a consumer 110 based on some type of identification.

In certain embodiments, receipt data 125 received at the host computer 130 is automatically categorized by the receipt program 134 or another program. In one embodiment, receipt data 125 can be categorized according to a name or other identifier of a merchant 120. For example, if the receipt data 125 is for a purchase from Home Depot, the receipt program 134 may be configured to automatically categorize this purchase as "home" or "home repair" whereas if the receipt data 125 is for a purchase from Macy's®, the receipt program 134 may be configured to automatically categorize this purchase as "clothing" or another suitable category. In other embodiments, the receipt data 125 includes item level receipt data that identifies a particular good 121 by name, description, identification code or number, etc., and a category can be assigned to one or more or all of the goods 121.

With continuing reference to FIGS. 1A and 2, at step 235, the consumer 110, through the consumer computer 150, accesses the host computer 130 to utilize the receipt program 134 to access and see receipt data 125 in the database 132. The receipt program 134 may be a desktop version or an on-line version, and the consumer computer 150 may be any suitable computing device such as a home computer, work computer, desktop or laptop computer. In the illustrated embodiment, the receipt program 134 is an on-line version that is hosted by the host computer 130, and the consumer computer 150 is operably coupled to or in communication with the host computer 130 via a network 140f. The receipt program 134 can be accessed or executed utilizing a web browser that executes on the consumer computer 150. As shown in FIG. 1B, communications between the consumer computer 150 and the host computer 130 may also involve JavaScript Object Notation (JSON) data interchange format and Secure Sockets Layer (SSL) communication protocol or other suitable formats and protocols and an associated host computer—consumer computer communications interface 133d.

Figure 4:
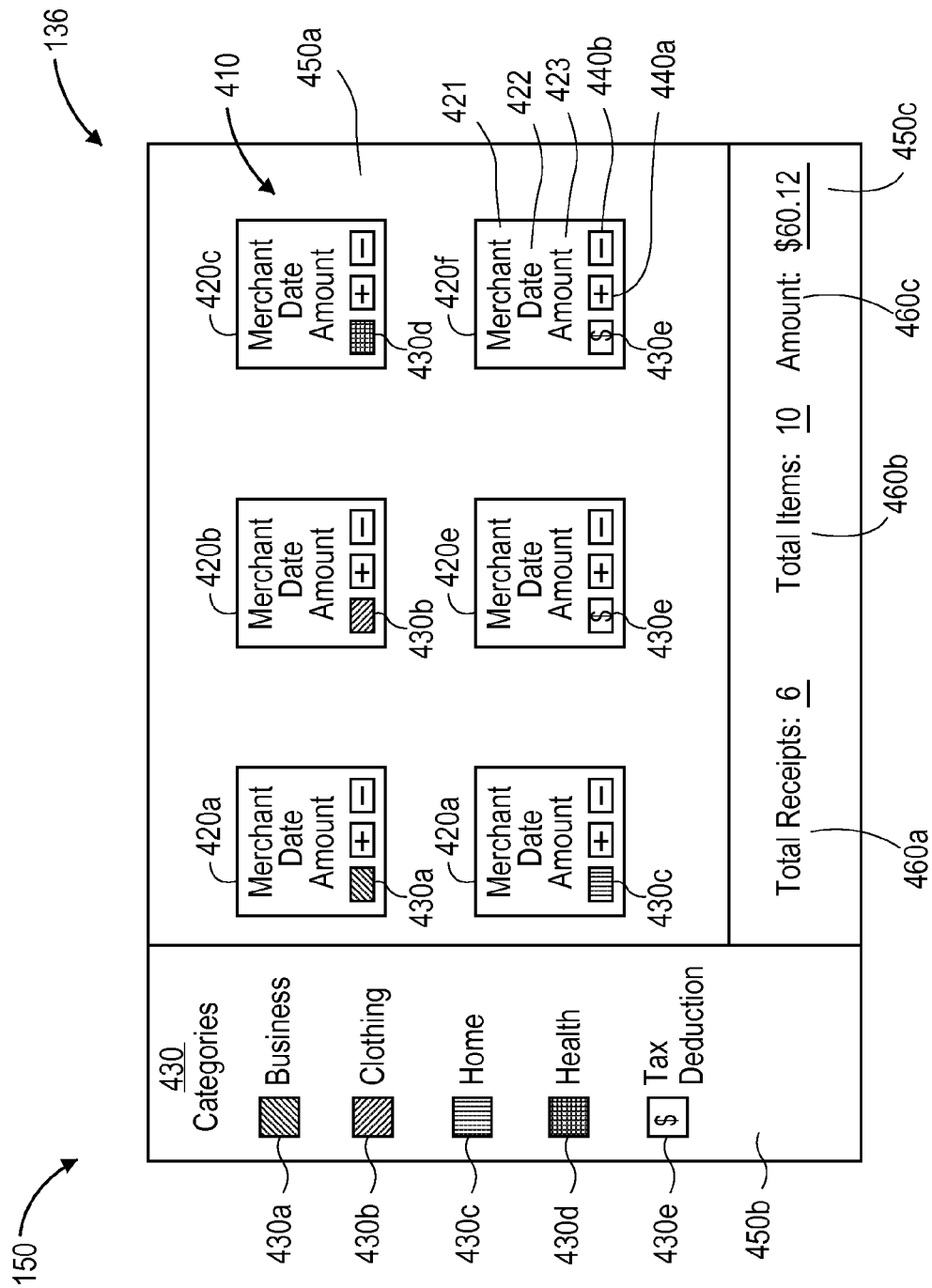
FIG. 4 illustrates one embodiment of a thumbnail arrangement of discrete objects that represent respective receipts.

Referring again to FIG. 1A, and with further reference to FIGS. 2 and 4, at stage 240, the receipt program 134 generates a user interface or display 136 that is to be presented to the consumer 110 at the consumer computer 150. At step 245, data 137 of the user interface 136 and related receipt data 125 are transmitted from the host computer 130 to the consumer computer 150, and at step 250, the interface 136, in the form of a thumbnail arrangement 410 of discrete objects 420, is displayed to consumer 110 on consumer computer 150. The discrete objects 420 represent respective receipts or receipt data 125 (generally, receipts).

In the illustrated embodiment, the thumbnail arrangement 410 includes six discrete objects 420a-f (generally, discrete object 420) that represent six respective receipts, but it should be understood that embodiments may involve various other numbers of discrete objects 420. In the illustrated embodiment, each discrete object 420 includes higher level receipt data such as a merchant name or identifier 421, a transaction date 422, and a transaction amount 423. In certain embodiments, the merchant name 422 is in the form of a logo. Further, in certain embodiments (although not illustrated in FIG. 4), a discrete object 420 may include a date by which the good 121 must be returned to the merchant 120 for an exchange or refund or a date when a warranty for the good 121 expires is indicated within a discrete object 420.

As shown in the illustrated embodiment, one or more or all of the discrete objects 420 may have category indicators 430a-e (generally, category indicator or category 430). The category indicators 430 may be color-coded and/or symbolic category indicators for categories such as business 430a, clothing 430b, home 430c, health 430d and tax deduction 430e, and one or more of these category indicators 430 may be assigned to one or more discrete objects 420 based on the receipt or item level receipt data 125 received from the transaction processing devices 124. A category indicator may also identify a particular brand of a good 121. For example, a category indicator 430 may identify Levi's® jeans. Categories 430 may be assigned to some, all or none of the discrete objects 420.

For example, a first discrete object 420a includes one category indicator 430a for business, a second discrete object 420b includes a category indicator 430b for clothing, a third discrete object 420c includes a category indicator 530d for health, a fourth discrete object 420d includes a category indicator 530c for home, and fifth and sixth discrete objects 420e and 420f include tax deduction indicators 530e. The discrete objects 430 may also include add ("+") 440a and subtract ("−") 440b tabs or icons that can be selected by the consumer 110 to add or delete a category 430.

In the illustrated embodiment, the user interface 136 includes a first window 450a for the thumbnail arrangement 410, a second window 450b for categories 430, and a third window 450c for spending summary data such as a total number of receipts 460a, a total number of items 460b across all receipts, and a total amount spent 460c on the items or a total value of all of the receipts. Further, although not illustrated in FIG. 4, but illustrated in other figures, the consumer 110 can select and view a thumbnail arrangement 410 of discrete objects 420 representing corresponding receipts for different periods of time, e.g., for the past week, past month, past two months, and other periods of time, and this data may also be presented in another window 450d (e.g., as shown in FIG. 6F).

In embodiment illustrated in FIG. 4, the discrete objects 420 are the same shape and size and spaced apart from each other to form the thumbnail arrangement 410, which allows a consumer 110 to quickly and easily visualize or view receipts and to visually recognize and comprehend spending patterns as opposed to line item transaction data that does not provide for such visualization, pattern recognition and comprehension. Thus, with embodiments, a consumer 110 can view a dashboard or snapshot of his or her spending and can quickly and easily visualize and understand spending patterns without having to read line item transaction data. Further, with the thumbnail arrangement 410, consumers 110 can quickly and easily see the frequency of visiting certain merchants 120.

In other embodiments, an attribute of a discrete object 420, e.g., its relative size compared to other discrete objects 420 and/or color, may indicate a relative amount spent on the goods 121 for that receipt. For example, a discrete object 420 representing a receipt having a receipt total that is greater than a pre-determined or average receipt total may be larger than other discrete objects 420 in order emphasize that discrete object 420 and indicate to the consumer 110 that the receipt corresponding to that discrete object 420 reflects purchases of a large number of goods or services or one or more big ticket or more expensive goods or services. Further, a discrete object 420 representing a receipt having a receipt total that is greater than a pre-determined or average receipt total may be a different color or outline (e.g., red), whereas other discrete objects 420 representing receipts having smaller receipt totals may be a different color or outline (e.g., yellow or green). These visual attributes further facilitate the ability of the consumer 110 to comprehend spending activities and patterns.

Moreover, discrete objects 420 within the thumbnail arrangement 410 can be arranged in different ways to indicate relative importance or receipt amounts. For example, in one embodiment, discrete objects 420 representing receipts with higher receipt totals are displayed at the top of the thumbnail arrangement 410, whereas discrete objects 420 representing receipts with lower receipt totals are displayed at the bottom of the thumbnail arrangement 410. As another example, discrete objects 420 representing receipts with higher receipt totals are displayed on the left side of the thumbnail arrangement 410, whereas discrete objects 420 representing receipts with lower receipt totals are displayed at the right side of the thumbnail arrangement 410. Further, discrete objects 420 categorized as "important" or "big ticket" may be at the top or left side of the thumbnail arrangement 410. Thus, discrete objects 420 can be arranged and displayed to indicate priority, importance and transaction amounts such that the consumer 110 can quickly ascertain which discrete objects may be most significant. Also, discrete objects 420 within the thumbnail arrangement 410 can be arranged such that certain types of goods 121 or discrete objects 420 representing receipts from particular merchants 120 are displayed at a certain location and/or emphasized by color and/or size.

Further, the spacing between discrete objects 420 may vary. In certain embodiments, each discrete object 420 is spaced apart from a neighboring or adjacent discrete object, but in other embodiments, e.g., depending on the number of receipts and corresponding discrete objects 420 and/or on the size or relative sizes of discrete objects 420, one or more or all of the discrete objects 420 may contact a neighboring or adjacent discrete object 420.

Further, discrete objects 420 may be presented as a collage. For example, multiple overlapping discrete objects 420 can be presented and the consumer 110 may click on or select various discrete objects to move or re-position selected discrete objects 420. Further, embodiments may involve displaying overlapping or collage type displays in view of relative importance, priority or transaction amounts. For example, in a collage of discrete objects 420, the top discrete objects 420, i.e., the discrete objects 420 that are most visible to the consumer 110, may be represent receipts with higher receipt totals or may be categorized as "important" or "big ticket" (or for a particular merchant 120) whereas discrete objects 420 that are not so categorized or that have lower receipt totals are located at the bottom of the collage such that the consumer 110 would have to move the visible discrete objects 420 at the top of the collage in order to access discrete objects 420 that are at lower levels of the collage and that may not be immediately visible or that are only partially visible. Thus, discrete objects 420 that overlap and that are arranged as a collage may also be arranged and displayed to indicate priority, importance and transaction amounts such that the consumer 110 can quickly ascertain which discrete objects may be most significant.

Figure 5:
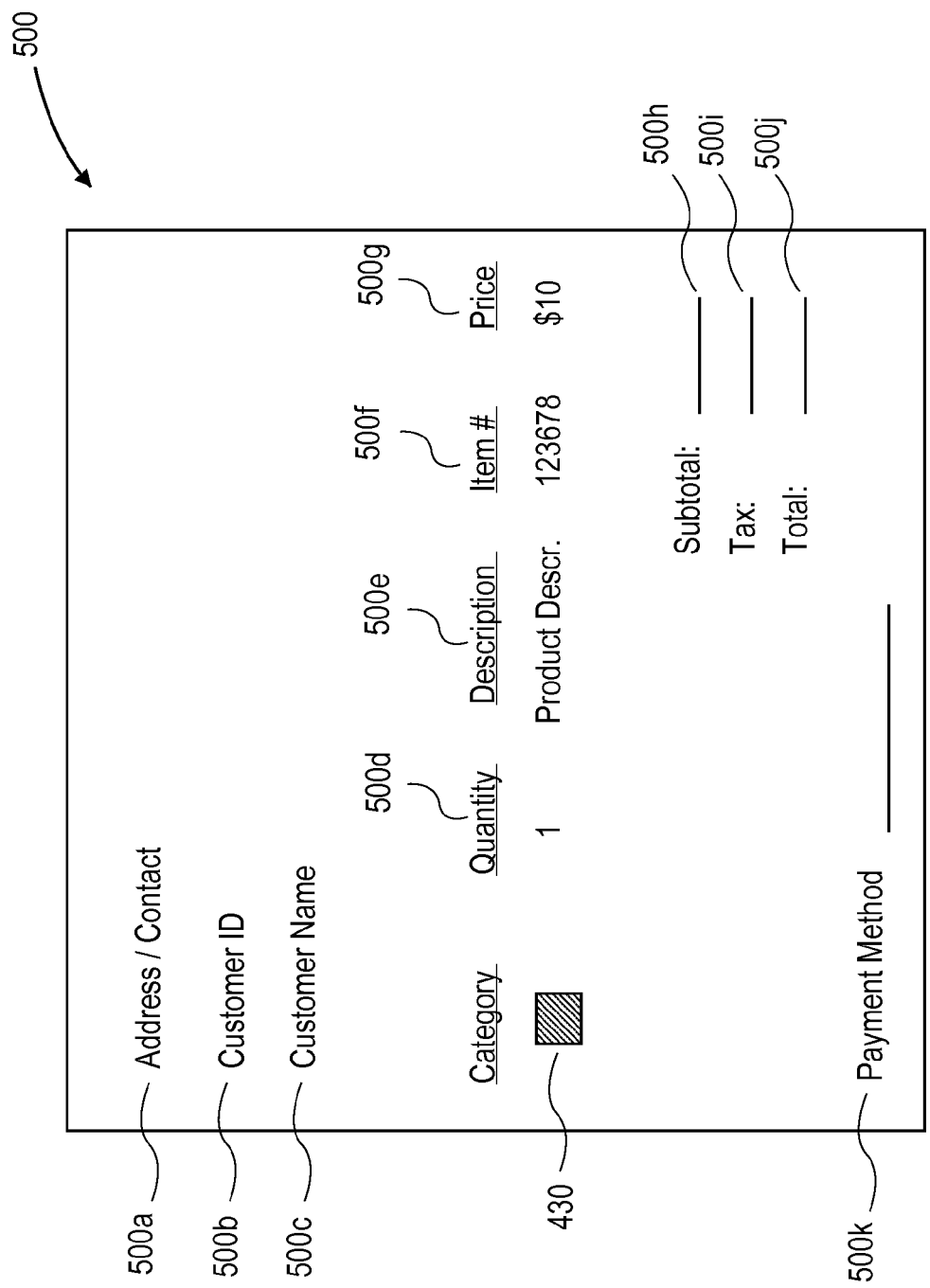
FIG. 5 illustrates item level receipt data that is presented to a consumer upon selecting a discrete object.

Referring to FIG. 5, the user may click on or select individual discrete objects 420 in order to obtain additional information 500 about the goods 121 to which a corresponding discrete object 420 and related receipt relates. In the illustrated embodiment, the additional information 500 includes a merchant or store contact information 500a, a customer identifier 500b (e.g., number of a transaction, rewards or club card), a customer name 500c, a quantity 500d and description 500e of the good and corresponding category or categories 430, a good identification number 500e (e.g., barcode, model or other number), a price 500g of each good, a subtotal 500h of all goods, tax 500i, a total amount 500j, and payment method 500k. Thus, a single discrete object 120 representing a receipt for multiple goods 121 may include multiple category indicators 530, and the additional or lower level or item level receipt data 500 may show particular categories 530 assigned to particular goods 121. In this manner, embodiments, provide multi-level categorization at both the discrete object 420 level and at a more detailed or item level.

Referring to FIGS. 6A-L, screen shots generated by the receipt program 134 illustrate one manner in which embodiments may be implemented. The screen shots are generated by a QuickReceipts® from Intuit Inc, but it should be understood that embodiments are not so limited.

Figure 6A:
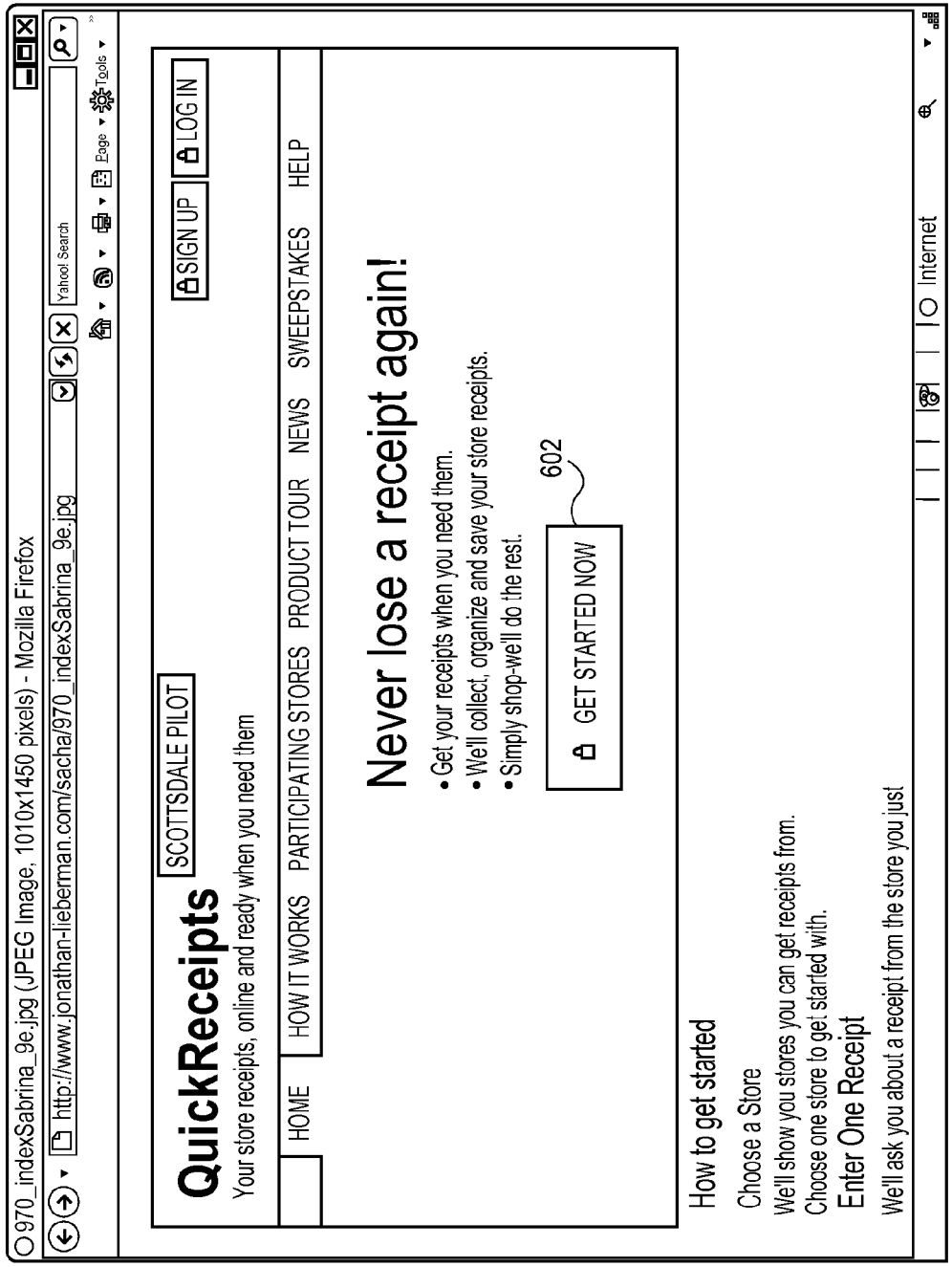

FIGS. 6A-B illustrate screen shots that are presented to the consumer 110 to allow the consumer 110 to sign up for or opt into receipt management utilizing the receipt program 134. FIG. 6A illustrates an initial screen shot introducing the consumer to QuickReceipts®. By clicking "Get Started Now" 602 the consumer 110 advances to the screen shown in FIG. 6B, which includes menus or fields 604a-h for consumer data used to create a QuickReceipts® account such as menus or fields for first name, last name, e-mail address, user ID, password, and a security question and answer.

Figure 6C:
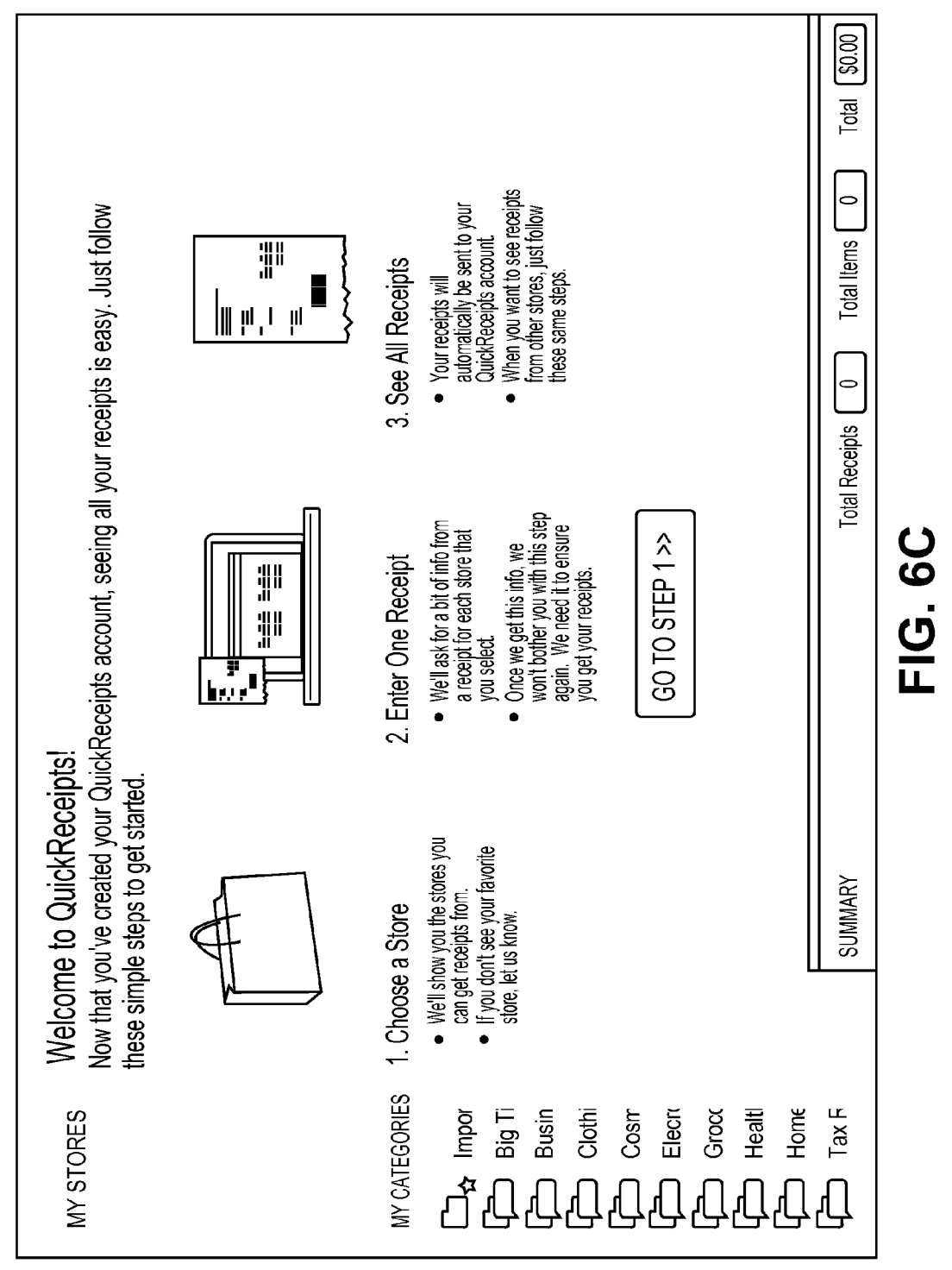

Referring to FIG. 6C, after initially creating a QuickReceipts® account, a screen shot of steps for the consumer 110 to follow to identify merchants 120 from whom receipt data 125 should be received or receipt data 125 that should be processed if the receipt data 125 is already collected and aggregated at the host computer 130. For this purpose, the consumer 110 may select a store or merchant 120 from a list, and with further reference to FIG. 6D, the consumer 110 is asked to confirm his or her identity and to provide a link to receipts from the selected merchant 120. For example, in the embodiment illustrated in FIG. 6D, a sample receipt from "Peek . . . Aren't Your Curious" is displayed, and the consumer 110 is requested to enter a "Curious Crew number" 606a (e.g., a number of a Peek . . . Aren't You Curious® rewards or membership card as an unique consumer identification), the date of the purchase 606b, and a transaction amount 606c. This links the receipt program 134 to this particular merchant 120 such that receipt data 125 will now be sent from Peek . . . Aren't You Curious® to the host computer 130 for inclusion in the receipt database 132.

Figure 6E:
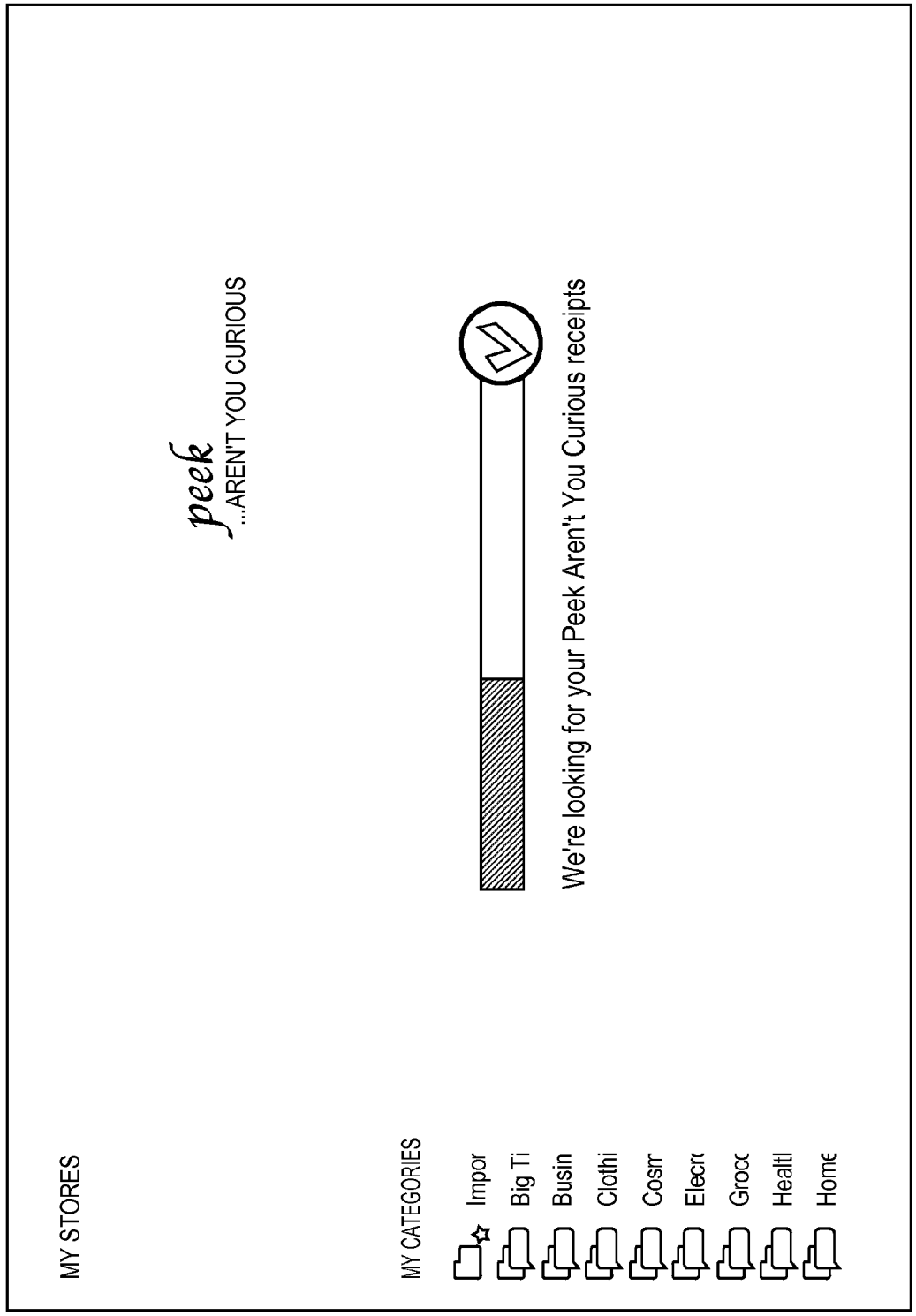
Figure 6F:
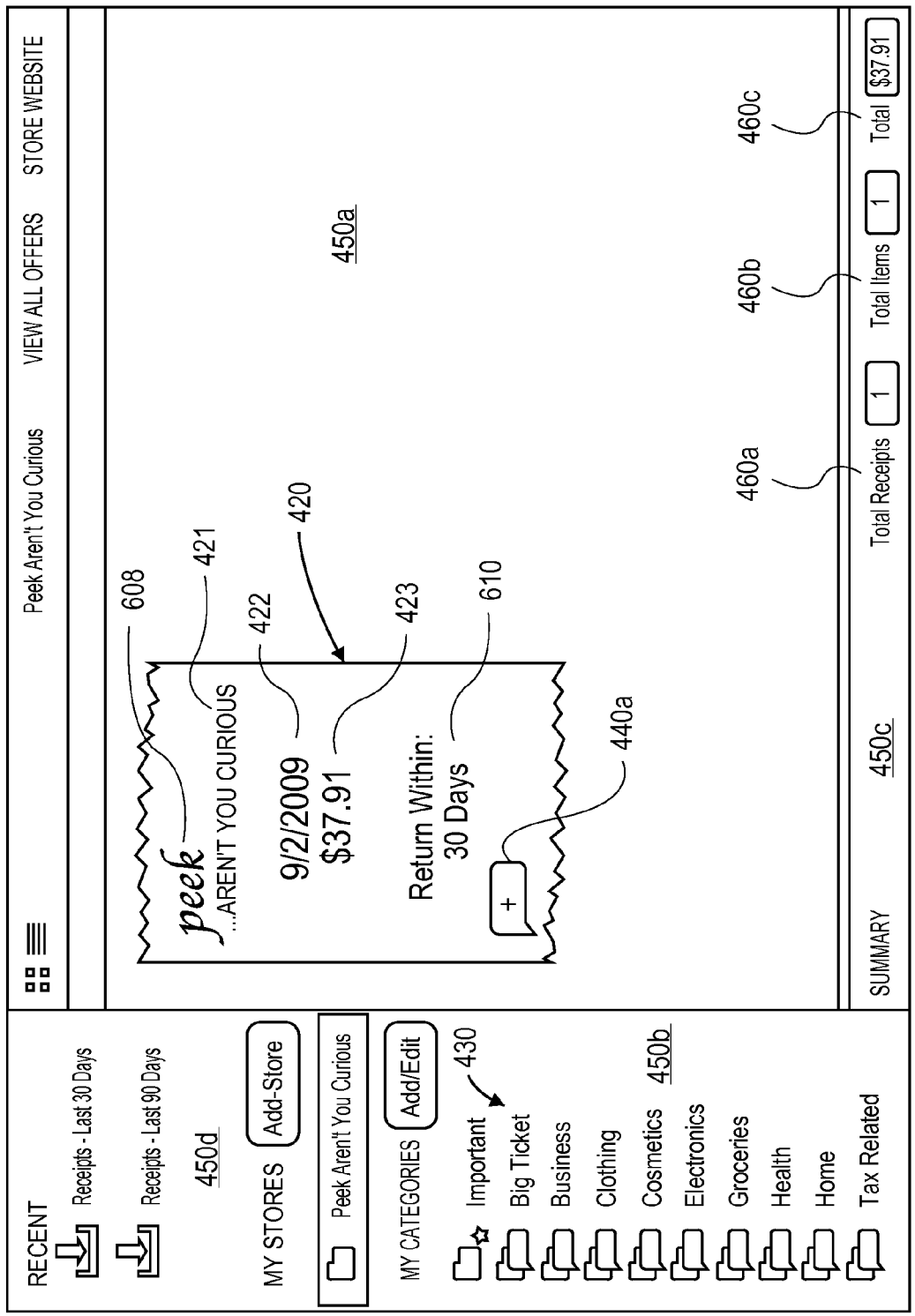

Referring to FIG. 6E, after receiving the requested data, and after the receipt data 125 is retrieved (if necessary), QuickReceipts® searches receipts of Peek . . . Aren't You Curious®, and referring to FIG. 6F, displays a discrete object 420 representing the receipt for an actual purchase of a good 121 by the consumer 110 from this particular merchant 120. In the illustrated embodiment, the user interface 136 includes four windows or sections 450a-d—a window 450d for selecting receipts for the past 30 days or 90 days (or other time period), a window 450b for categories 430 (e.g., Important, Big Ticket, Business, Clothing, Cosmetics, Electronics, Groceries, Healthcare, Home, Tax Related and other categories), and a window 450a for the thumbnail arrangement 410 of discrete objects 420 (one discrete object is shown in FIG. 6F) representing receipts. In the illustrated embodiment, the discrete object 420 includes a logo 608 of "Peek . . . Aren't You Curious", a transaction date 422 of Sep. 2, 2009, and a transaction amount 423 of $37.91. The discrete object 420 also includes a "Return Within" field 610 that indicates the number of days in which the good 121 can be returned to the merchant 120 for a refund or exchange. Further, the discrete object 420 includes a category indicator which, in this example, is a "+" indicator 440a that allows the consumer to add a category to the discrete object 420 to associate one or more goods related to that discrete object 420 with that category. Further, the window 450c includes a spending summary for the displayed discrete object 120, e.g., a total number of receipts 460a (which in this example is "1"), a total number of items 460b (also "1" in this example) and a total amount spent 460c ($37.91 in this example).

Referring to FIG. 6G, the consumer 110 selecting or clicking on the discrete object 120 representing the receipt from Peek . . . Aren't You Curious® results in displaying lower level, or item level, details about the good 121 on this receipt to the consumer 110. In the illustrated embodiment, the interface includes three windows—a window 450d for selecting whether to display receipts from this merchant 110 from the last 30 days or other numbers of days, a window 450b including the categories 430, and a window 612 with additional receipt data.

For example, in the illustrated embodiment, additional receipt data includes a transaction date 500l, a name or contact information of the merchant 500a (e.g., store number, address, cashier number) a transaction number 500m, an identification 500b of the consumer (e.g., a number of the store or rewards card of the consumer), the name 500c of the consumer, a quantity 500d and description 500e of the goods purchased, a category 430 of the good, an item number 500f, price 500g, subtotal 500h, tax 500i and total 500j. The additional information may also include a payment method 500k (e.g., debit card, credit card, etc.), and the account number of the transaction card, and a barcode 500n or other identifier that identifies a particular good 121 or a particular receipt or transaction.

Thus, with embodiments, a consumer 110 can view the thumbnail arrangement 410, quickly determine spending data and spending patterns based on the discrete objects 420 shown (one discrete object is shown in FIG. 6F), and as necessary, click on or select a discrete object 420 to display additional or lower level receipt information (e.g., as shown in FIG. 6G). Further, the consumer 110 can click on or select a category 430 in the window 450b to display receipt data that relates to a particular category for purposes of money management and spending analysis.

Figure 6H:
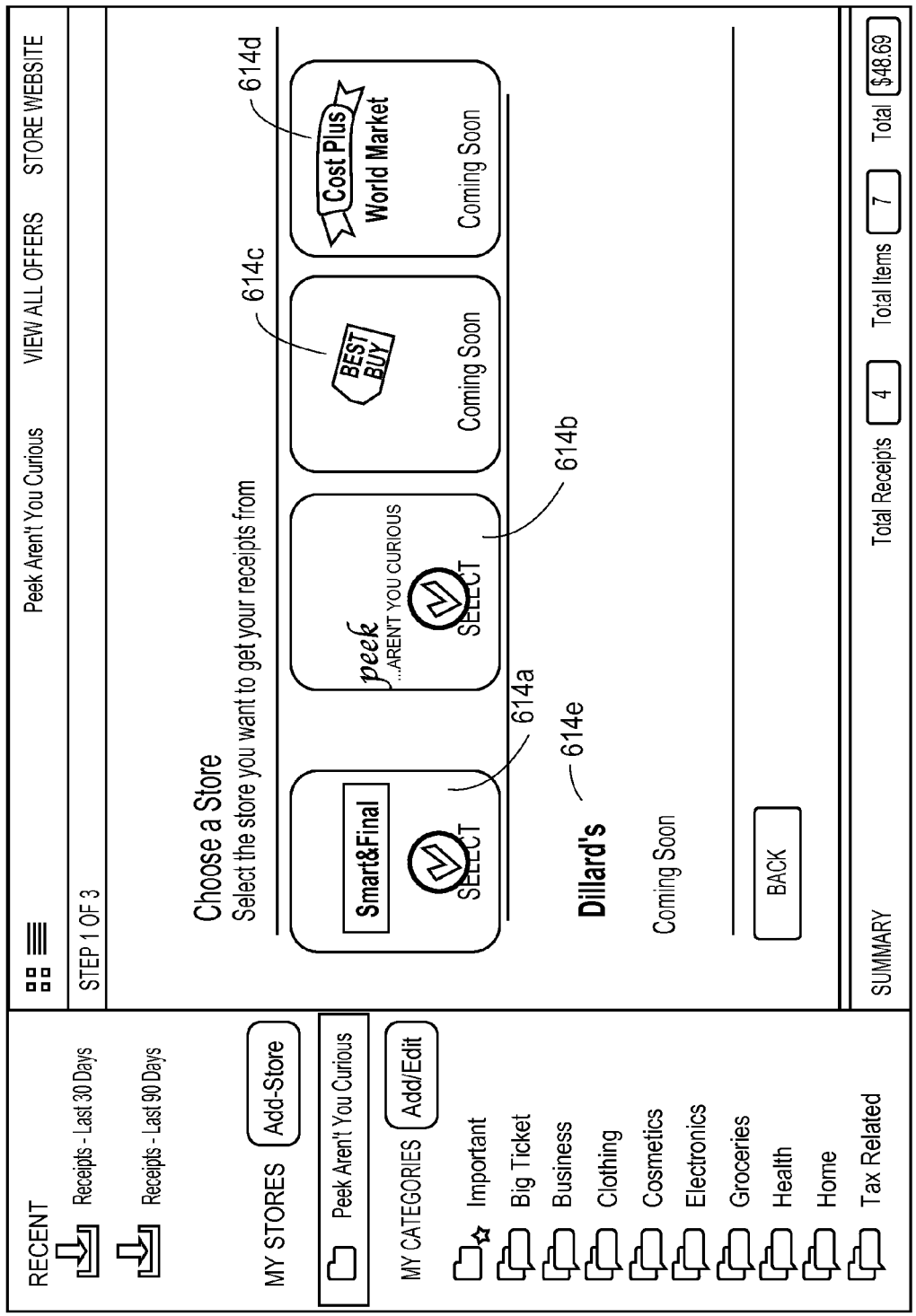
Figure 6I:
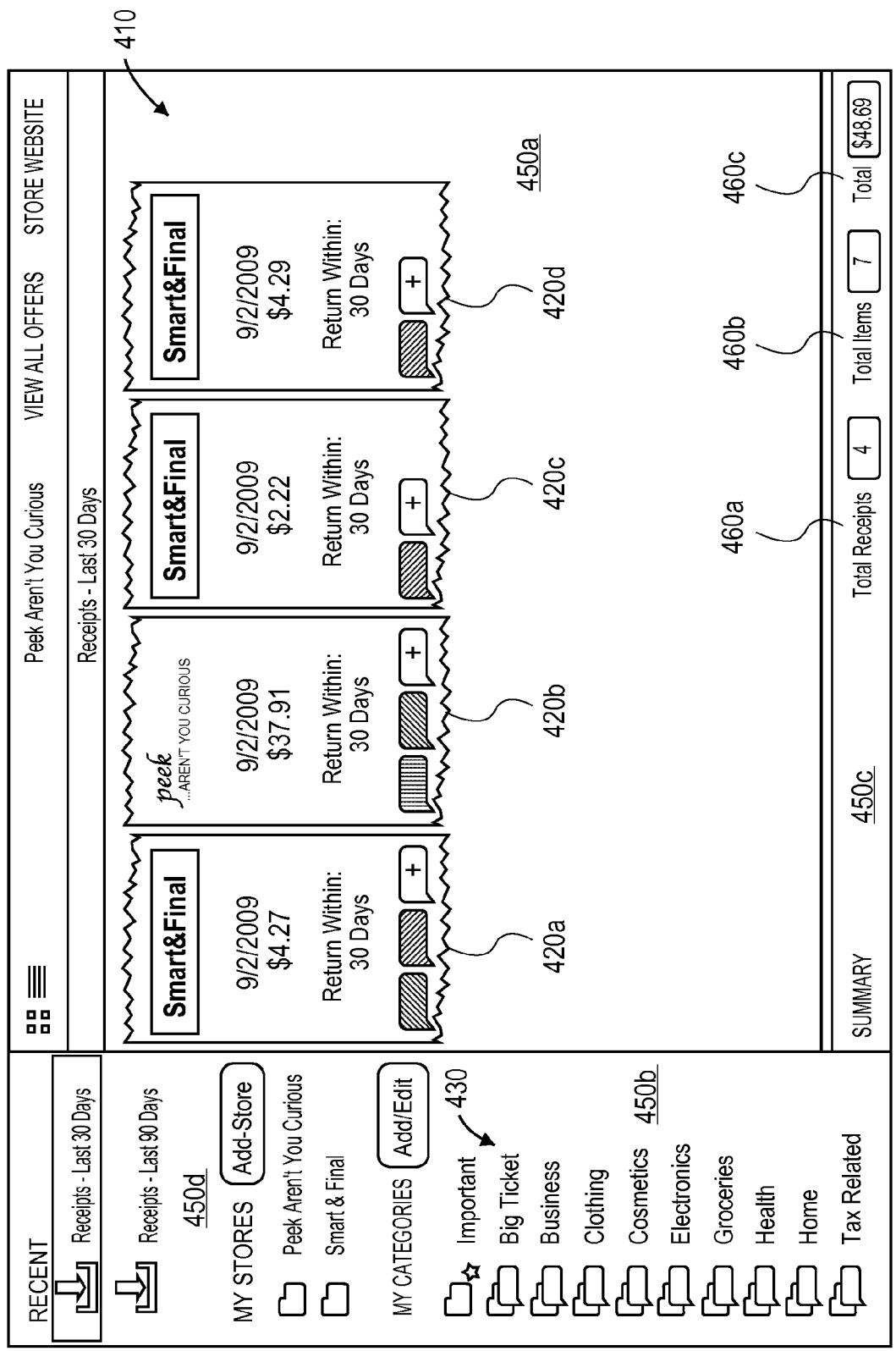

FIGS. 6H-J illustrate a more detailed example of how embodiments may be implemented. Referring to FIG. 6H, the consumer 110 may select additional stores or merchants 120 from whom receipt data 125 related to purchases by the consumer 110 is to be collected and stored in the database 132 and processed with the receipt program 134 such as QuickReceipts®. In the illustrated embodiment, the consumer 110 can select from five stores—Smart & Final® 614a, Peek . . . Aren't Your Curious® 614b, Best Buy® 614c, World Market® 614d and Dillard's® 614e. It should be understood that embodiments may involve various numbers of merchants 120, and that five merchants 120 are illustrated in FIG. 6H for purposes of explanation and illustration, not limitation.

The consumer 110 may select some or all of the available merchants 120. In the illustrated embodiment, the consumer 110 has selected two stores (indicated by check marks)—Smart & Final® 614a and Peek . . . Aren't Your Curious® 614b. Thus, the receipt program 134 such as QuickReceipts® searches the database 134 or retrieves receipt data 125 from the merchants 120 to identify receipts from the selected merchants 614a and 614b. Referring to FIG. 6I, the receipt program 134 is operable to display a thumbnail arrangement 410 of four discrete objects 420a-d that represent three receipts from Smart & Final® 614a and one receipt from Peek . . . Aren't You Curious® 614b. The thumbnail arrangement 410 is displayed in a window 450a and a window 450c includes a spending summary including a total number of receipts 460a (4), a total number of items 460b (7) and a total amount of all receipts 460c ($48.69), another window 450d that allows the consumer 110 to view receipt data 125 within the last 30 days or other numbers of days, and window 450e allows the consumer 110 to select which merchants 120 should be selected (e.g., selecting Smart & Final® 614a will result in display of three discrete objects 420a, 420c and 420d) for the three Smart & Final® receipts, whereas selecting Peek . . . Aren't You Interested will result in display of the one discrete object 420b), and a window 450b for categories 430. In the illustrated embodiment, each of the discrete objects 410a-d is assigned at least one category 430, and the consumer 110, as part of money management or spending analysis, may also select a particular category 430, and discrete objects 420 having corresponding category 430 indicators are then displayed to the consumer 110.

Referring to FIG. 6H, when the consumer 110 selects or clicks on a discrete object 420 such as discrete object 420 (in the amount of $4.27), the related lower or item level receipt data 125 corresponding to the Smart & Final® receipt represented by that discrete object 120a is displayed. In the illustrated embodiment, the discrete object 120a represents a receipt for the purchase of three goods (identified under the "description" 500e column): El Guapo Menudo Mix, water, and water, and having respective item numbers (identified under the "item#" 500f column) and prices (identified under the "price" 500g column). Other aspects of the interface are the same as or similar to aspects described with reference to other figures.

Figure 6K:
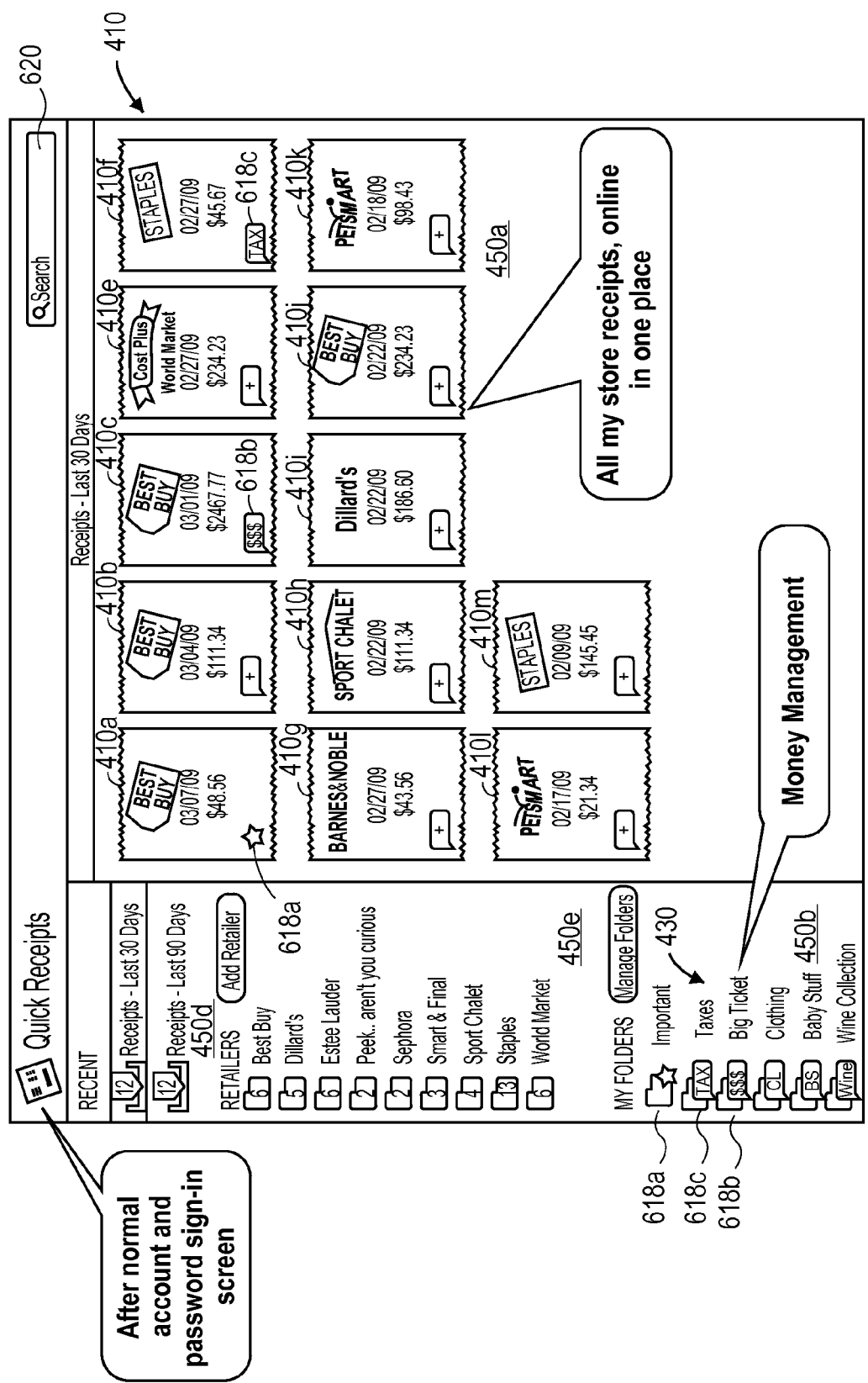
Figure 6L:
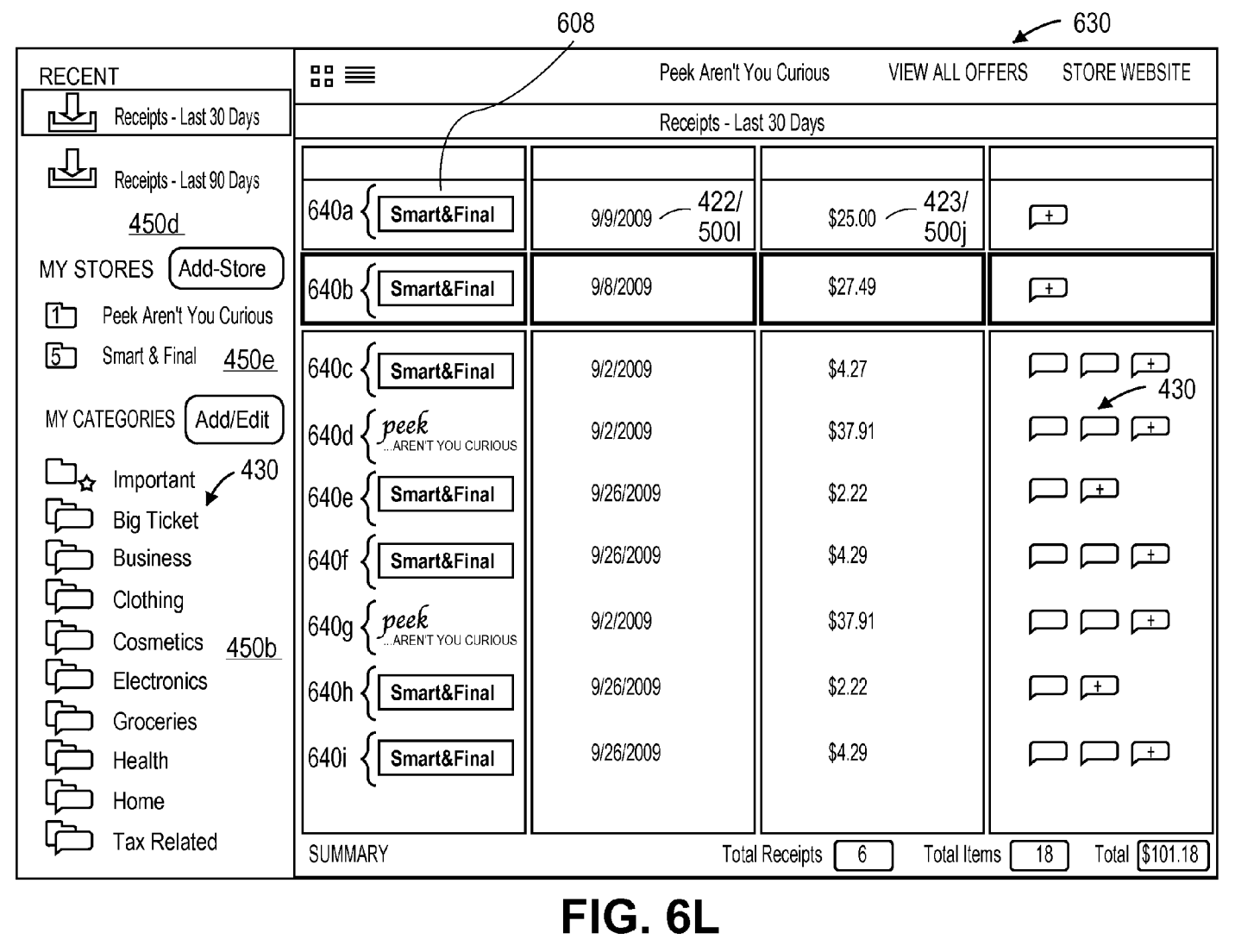
Figure 7:
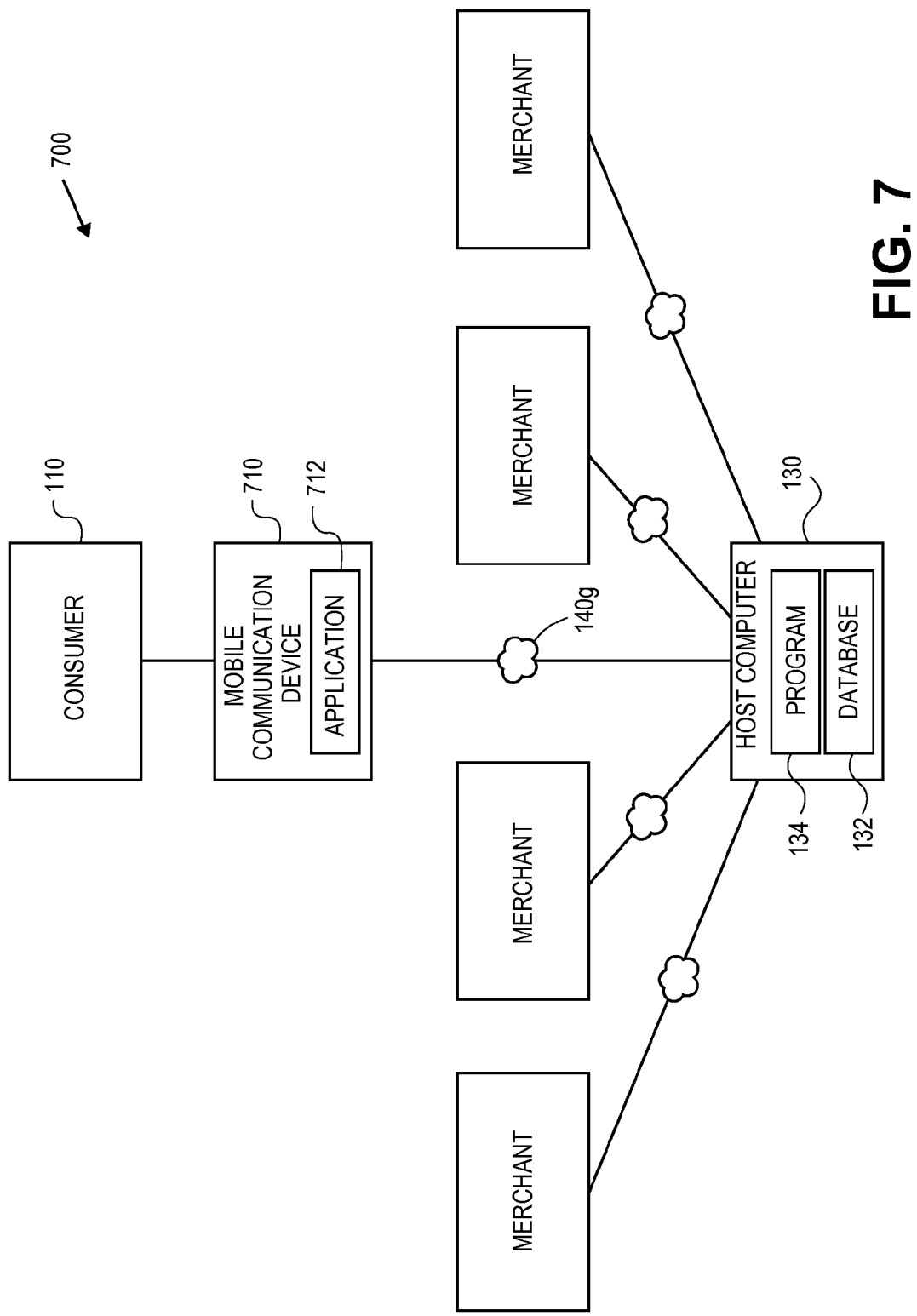
FIG. 7 illustrates a system constructed according to one embodiment for searching for receipt data at a host computer utilizing a mobile communication device.

FIGS. 6K-L illustrate yet another example of an embodiment of an interface including a thumbnail arrangement 410 of discrete objects that represent receipts. Referring to FIG. 6K, the consumer 110 may select additional stores or merchants 120 from whom receipt data 125 related to the consumer 110 is to be collected and processed using the receipt program 134 such as QuickReceipts®. In the illustrated embodiment, the consumer 110 has selected seven different merchants or stores 120: Best Buy®, World Market®, Staples, Barnes & Noble, Sport Chalet, Dillards® and PetSmart®. It should be understood that embodiments may involve various numbers of stores, and that seven stores are illustrated for purposes of explanation and illustration, not limitation. As a result, the receipt program 134 such as QuickReceipts® searches the receipt data 125 of these seven stores that were received at the host computer 130 and stored in the database 134 and displays the thumbnail arrangement 140 of ten discrete objects 140a-m that represent four receipts from Best Buy®, one receipt from World Market®, two receipts from Staples, one receipt from Barnes & Noble®, one receipt from Sport Chalet®, one receipt from Dillard's® and two receipts from Pet Smart®. The thumbnail arrangement 410 may be displayed in a window together with a spending summary and a windows 450d that allows the consumer 110 to view receipt data within the last 30 days or other numbers of days, a window 450e that allows the consumer 110 to select which stores should be selected (e.g., selecting Best Buy® will result in display of four discrete objects 410a-c and 410j for the four Best Buy® receipts), and a window 450b for categories 430.

As shown in FIG. 6K, a category 430 is assigned to certain discrete objects 410a, 410c, 410f, but not the other discrete objects. For example, the consume 110 may assign an "important" category, identified by an indicator or symbol such as a star 618a, to the discrete object 410a for Best Buy® to indicate that the consumer 110 considers this receipt or a related good 121 purchased from Best Buy® to be particularly important. As another example, the consume 110 may assign a "Big Ticket Purchases" category 618b to a different discrete object 410c to indicate that the good 121 identified on this receipt and purchased from Best Buy® is a big ticket or expensive item, e.g., such as a home appliance, television or computer. "Tax" category 618c may be assigned to another discrete object 410f to indicate that the good 121 identified on that receipt and purchased from Staples may be tax deductible.

FIG. 6K also illustrates a search field 620 that may be utilized by the consumer 110 to enter search terms (e.g., types of products, store names, etc.), such that the discrete object 410 having receipt data 125, including lower level or item level receipt data 125, that matches the search terms will be displayed to the consumer 110 who can then select or drill down to item level receipt detail until the desired information is obtained.

In one embodiment, as shown in FIGS. 6K-L, the consumer 110 may switch between different interface views. In the illustrated embodiment, the consumer 110 may switch between a thumbnail arrangement 410 of discrete objects 420 (as shown in FIG. 6K) and a non thumbnail arrangement such as a line item view 630 having multiple line items 640a-I (generally line item 640) for different receipts (as shown in FIG. 6L). This may be helpful in situations when the thumbnail arrangement 410 is suitable for particular views or spending pattern determinations by the consumer 110, whereas the line item view 630 may be more appropriate in other situations, e.g., if the consumer 110 wants to view receipt data 125 in chronological or reverse chronological order (as shown in FIG. 6L). Thus, embodiments, in contrast to known systems, allow for different types of views and switching between a non-line item arrangement such as a thumbnail arrangement 410 of discrete objects 420 representing receipts and a line item view 630 to enhance the ability of the user to view and analyze receipt data and spending. When the consumer 110 selects or clicks on a discrete object 420 (as shown in FIG. 6K) or a line item 640 (as shown in Fig. L) results in displaying lower level, or item level, details about the good(s) on the receipt corresponding to the selected object 420 or line item 640.

Referring to FIGS. 7, 8A-I and 9, other embodiments, which may be stand alone embodiments or utilized with embodiments described with reference to FIGS. 1-6L, are directed to systems 700 and methods 800 for providing information about a good 121 to a mobile communication device 710. The system 700 includes system components described with reference to FIG. 1A including a host computer 130 that receives receipt data 125 from various merchants 120, and a mobile communication device 710, such as a cellular telephone, smartphone and other suitable mobile computing or communication device (generally, mobile communication device 810) that is in communication with the host computer via a network 140g.

Figure 9:
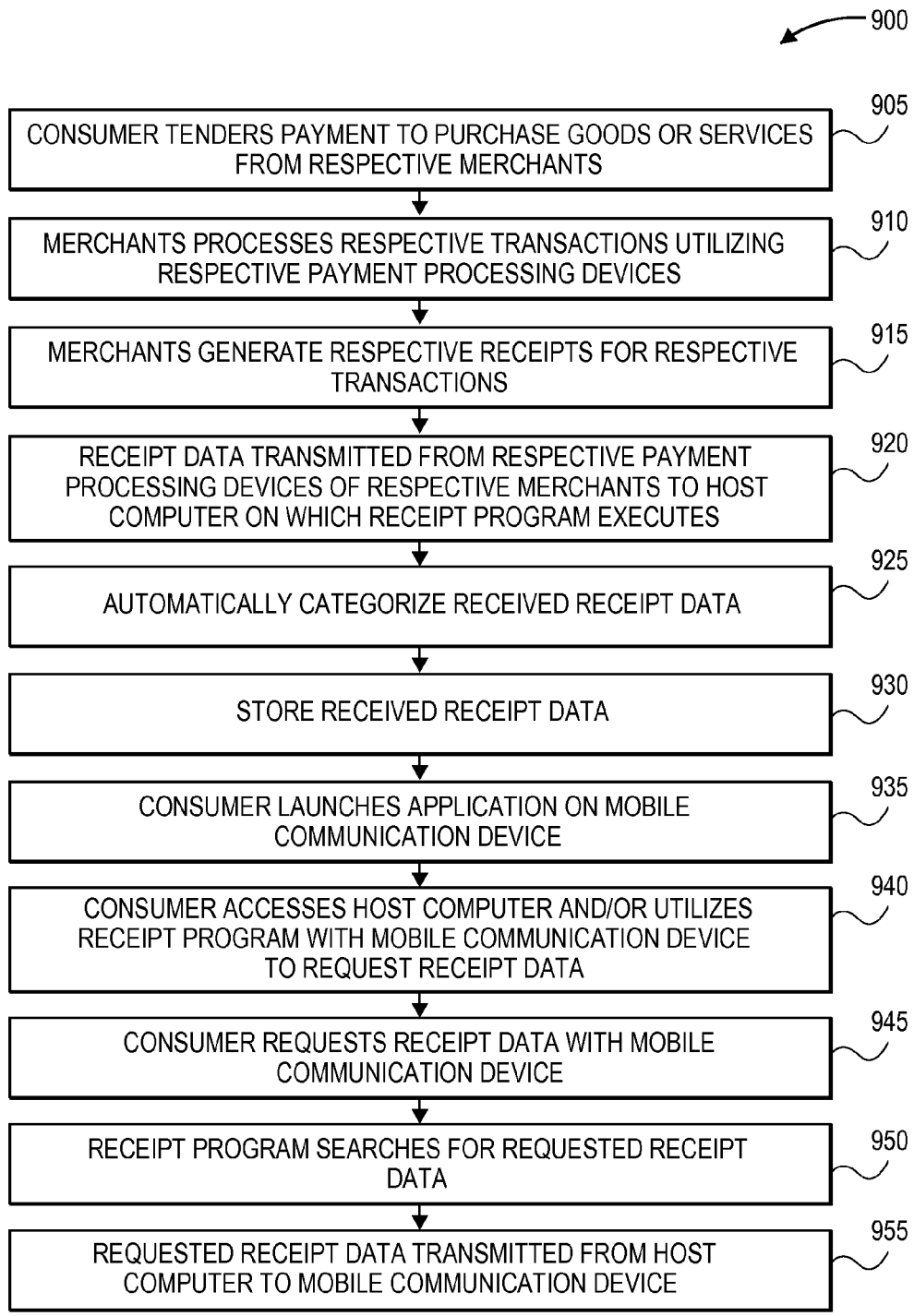
FIG. 9 is a flow chart of one embodiment of a method for searching for receipt data at a host computer utilizing a mobile communication device.

With further reference to FIG. 9, prior to use of the mobile communication device 710, at stages 905-930 (which are the same as or similar to steps 205-230 described with reference to FIG. 2), the consumer 110 tenders payment 111 to purchase a goods 121 from respective merchants 120, the merchants 120 process respective transactions utilizing respective transaction processing devices 124, generate respective receipts 123 and receipt data 125, transmit receipt data 125 from respective transaction processing devices 124 to the host computer 130 on which the receipt program 134 executes, and the receipt data 125, which may be categorized, is stored in the database 132 on the host computer 130. At some later time, at stage 935, the consumer 110 launches an application 712 on the mobile communication device 710 to access the host computer 130 via the network 140g and/or to utilize the receipt program 134 to retrieve certain receipt data 125 stored in the database 134 at stage 940. At stage 945, the consumer 110 requests receipt data 125 with the application 712 executing on the mobile communication device 710.

Figure 8A:
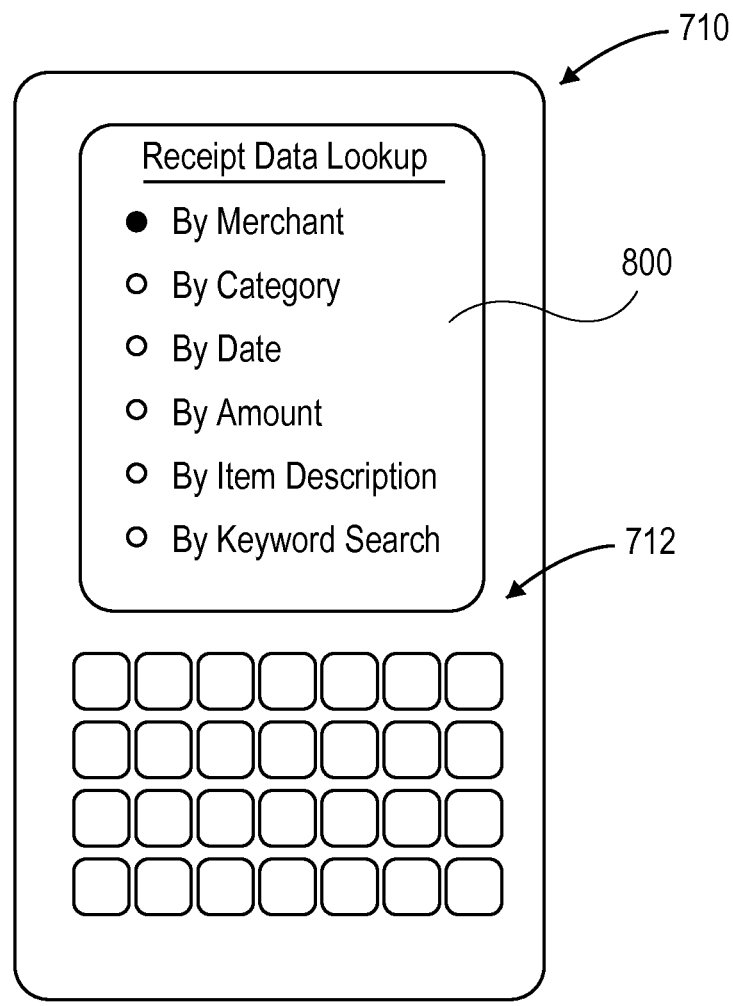

For example, referring to FIG. 8A, the application 712 may generate an interface or page 800 that is displayed on a screen of the mobile communication device 710 and that allows the consumer 110 to select criteria that will be used to conduct a search for receipt data 215. For example, in the illustrated embodiment, the interface may include options for looking up receipt data 215 by merchant, category, transaction ate, amount, item description or keyword search. Selecting one of these categories may result in display of a page with corresponding merchant 802a (FIG. 8B), category 802b (FIG. 8C), transaction date 802c (FIG. 8D), transaction amount 802d (FIG. 8E), item description 802e (FIG. 8F) and a search field for keywords 802f (FIG. 8G). Continuing with the example in which the consumer 110 decides to search for receipt data 125 related to a good 121 purchased from a particular merchant 120 (as shown in FIG. 8B), the consumer 110 may select Best Buy® (as indicated by darkened or selected circle) such that the next page 812a (e.g., as shown in FIG. 8H) may be displayed by the application 712 to the consumer 110. As shown in the embodiment illustrated in FIG. 8G, the page 812a may listed the various goods 121 purchased by the consumer 110 from Best Buy® as indicated by prior receipt data 125 previously received by the host computer 130 from Best Buy®. At stage 950, the receipt program 134 searches the database 134 for the requested receipt data 125, and at stage 955, assuming the requested data 125 is located, it is sent from the host computer 130 to the to mobile communication device 710 via network 140g and displayed on the screen of the mobile communication device 710 to the consumer 110

As an example of how embodiments may be utilized and assist consumers 110, a consumer 110 may be at a store purchasing a component for a household item such as a bag for a vacuum. The consumer 110, however, upon seeing various available vacuum bags, is not certain of the vacuum brand or model number such that the proper vacuum bag cannot be identified. However, with embodiments, the consumer 110 can launch the receipt data application 712 on a mobile communication device 710 to search the receipt data 215 for the brand and/or model number of the vacuum purchased from Best Buy® such that the consumer can select the correct type of vacuum bag. Thus, in the embodiment illustrated in FIGS. 8H-I, for example, the consumer 110 may recall purchasing the vacuum from Best Buy® and navigate menus or pages generated by the application 712 to arrive at the listing of goods 121 purchased from Best Buy® as shown in FIG. 8H. The consumer may then select "Hoover® Vacuum" to view additional data about the vacuum, including a model number, as shown in FIG. 8I.

In the illustrated embodiment, the brand and type of good 121 are presented to the consumer in the page or screen 812a, but in other embodiments, more or less information about the various goods 121 may be presented, and if the information presented in this page does not answer the consumer's question, the consumer 110 can select a particular good 121 to retrieve additional information as shown in FIG. 8I. Thus, embodiments allow for remote lookup of receipt data 125, including item level receipt data such as a model number, utilizing a mobile communication device 710 that is in communication with the host computer 130.

Figure 10:
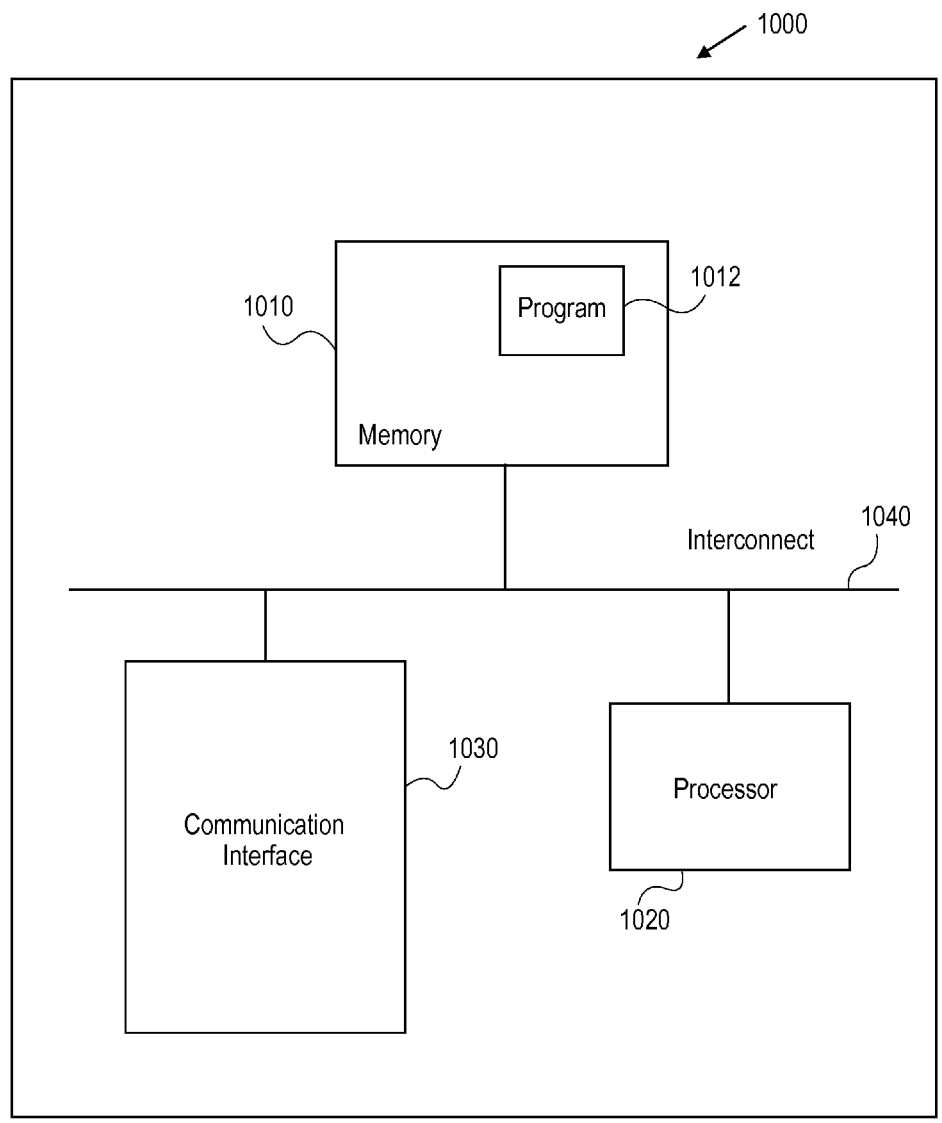
FIG. 10 is a block diagram of components of a computing apparatus or system in which various embodiments may be implemented or that may be utilized to execute various embodiments.

FIG. 10 generally illustrates components of a computing device 1000 that may be utilized to execute embodiments and that includes a memory 1010, account processing program instructions 1012, a processor or controller 1020 to execute account processing program instructions 1012, a network or communications interface 1030, e.g., for communications with a network or interconnect 1040 between such components. The memory 1010 may be or include one or more of cache, RAM, ROM, SRAM, DRAM, RDRAM, EEPROM and other types of volatile or non-volatile memory capable of storing data. The processor unit 1020 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1040 may include a system bus, LDT, PCI, ISA, or other types of buses, and the communications or network interface may, for example, be an Ethernet interface, a Frame Relay interface, or other interface. The network interface 1030 may be configured to enable a system component to communicate with other system components across a network which may be a wireless or various other networks. It should be noted that one or more components of computing device 1000 may be located remotely and accessed via a network. Accordingly, the system configuration provided in FIG. 10 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1020 performs steps or executes program instructions 1012 within memory 1010 and/or embodied on the carrier to implement method embodiments. Further, embodiments may reside and execute on a mobile communication device 710 such as a cellular telephone or smartphone.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments are described with reference to a receipt program such as QuickReceipts®, embodiments may also be implemented by or using other receipt programs, which may also be desktop or on-line programs. Further, while embodiments are described with reference to an individual consumer, embodiments may also be applied to multiple consumers, which may be individual and/or business consumers. Thus, the receipt database may include receipt data for hundreds and thousands of different consumers, each of which may purchase goods or services from various merchants, the receipt data from which is stored in the receipt database, and receipt data may be aggregated, e.g., within a database managed by Intuit Inc., for various consumers and for various merchants for use in embodiments Further, receipt data that is sent to the host computer can be stored based on various types of purchase including, but not limited to, credit card, debit card, check, electronic check, ATM withdrawal, ACH and other forms of electronic transactions. Receipt data that is sent to the host computer may also be generated as a result of cash purchases, and paper receipts can be scanned and processed for inclusion in the receipt database.

It should be understood that while certain mobile communication device interfaces or pages are described, the number of pages, menus or options and arrangement and menu and option items may vary. Thus, examples involving navigation of menu pages based on a merchant name followed by goods purchased from that merchant are provided to illustrate one manner in which embodiments may be implemented, and other embodiments may involve navigation through other pages based on other search criteria and data.

Further, the number, arrangement, and spacing of discrete objects of a thumbnail arrangement may vary. Moreover, it should be understood that certain discrete objects can be emphasized to indicate their importance, e.g., by one or more of color, shape, size and position or location of a discrete object.

Further, where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially.

Accordingly, embodiments are intended to exemplify alternatives, modifications, and equivalents that may fall within the scope of the claims.

What is claimed is:

1. A computer-implemented method of visually presenting spending activity to a consumer, the method comprising:
receiving, at a first computer, respective electronic receipt data from respective transaction processing devices of respective merchants, the respective electronic receipt data identifying purchases of respective goods or services by the consumer from respective merchants; and
generating a user interface with a receipt program executing on the first computer, the user interface comprising:
a first view generated by the receipt program and comprising a thumbnail arrangement of a plurality of discrete objects that represent respective receipts generated by respective transaction processing devices, the thumbnail arrangement comprising:
- a first field populated by the receipt program and comprising a total number of receipts represented by the plurality of discrete objects,
- a second field populated by the receipt program and comprising a sum of respective numbers of goods or services identified by respective receipt data, and
- a third field populated by the receipt program and comprising a sum of respective total amounts of respective purchases identified by respective receipt data, the discrete objects being separated from the first field, the second field and the third field; and
- a second view generated by the receipt program and displayed in response to the consumer selecting or opening a discrete object displayed in the first view, wherein an indicator of a category of spending activity of the consumer is displayed in both the first view and in the second view.

2. The method of claim 1, the category indicator comprising a color-coded or symbolic indicator.

3. The method of claim 1, a plurality of category indicators of spending activity of the consumer being displayed in the first view and in the second view.

4. The method of claim 1, wherein more information and more types of information about spending activity of the consumer are displayed in the second view compared to object data displayed in the first view.

5. The method of claim 1, each discrete object comprising a portion of data of information included in a paper receipt provided to the consumer for purchase of a good or service from a merchant.

6. The method of claim 1, at least one discrete object displayed in the first view comprising a category indicator but not identifying any particular good or service.

7. The method of claim 1, at least one discrete object comprising a plurality of category indicators but not identifying a particular good or service.

8. The method of claim 1, the user interface being displayed on a second computer to the consumer.

9. A computer-implemented method of visually presenting spending activity to a consumer, the method comprising:
   receiving, at a first computer, respective electronic receipt data from respective transaction processing devices of respective merchants, the respective electronic receipt data identifying purchases of respective goods or services by the consumer from respective merchants; and
   generating a user interface with a receipt program executing on the first computer, the user interface comprising
   a first view generated by the receipt program and comprising a thumbnail arrangement of a plurality of discrete objects that represent respective receipts generated by respective transaction processing devices, the thumbnail arrangement comprising:
   - a first field populated by the receipt program and comprising a total number of receipts represented by the plurality of discrete objects,
   - a second field populated by the receipt program and comprising a sum of respective numbers of goods or services identified by respective receipt data, and
   - a third field populated by the receipt program and comprising a sum of respective total amounts of respective purchases identified by respective receipt data, the discrete objects being separated from the first field, the second field and the third field; and
   a second view generated by the receive program and displayed in response to the consumer selecting or opening an discrete object of the first view, wherein an indicator of a category of spending activity of the consumer is displayed in both the first view and the second view, and item-level data identifying a particular good or service purchased by the consumer is displayed in the second view but not the first view.

10. The method of claim 9, the category indicator comprising a color-coded or symbolic indicator.

11. The method of claim 9, a plurality of category indicators being displayed in the first view and in the second view.

12. The method of claim 9, wherein more information and more types of information about spending activity of the consumer are displayed in the second view compared to object data in the first view.

13. The method of claim 9, each discrete object comprising a portion of data of information included in a paper receipt provided to the consumer for purchase of a good or service from a merchant.

14. The method of claim 9, at least one discrete object displayed in the first view comprising a category indicator but not identifying any particular good or service.

15. The method of claim 9, at least one discrete object comprising a plurality of category indicators but not identifying a particular good or service.

16. The method of claim 9, wherein the category indicator is displayed in a discrete object displayed in the first view and in the second view generated by selection of the discrete object.

17. The method of claim 9, the user interface being displayed on a second computer to the consumer.

* * * * *